(12) United States Patent
Shin et al.

(10) Patent No.: US 12,217,709 B2
(45) Date of Patent: Feb. 4, 2025

(54) DISPLAY APPARATUS

(71) Applicant: SAMSUNG ELECTRONICS CO., LTD., Suwon-si (KR)

(72) Inventors: Seungyong Shin, Suwon-si (KR); Jungmo Kang, Suwon-si (KR); Changhoon Kim, Suwon-si (KR); Yongmin Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/125,541

(22) Filed: Mar. 23, 2023

(65) Prior Publication Data

US 2023/0402017 A1 Dec. 14, 2023

Related U.S. Application Data

(63) Continuation of application No. PCT/KR2023/003161, filed on Mar. 8, 2023.

(30) Foreign Application Priority Data

Jun. 8, 2022 (KR) .................. 10-2022-0069793

(51) Int. Cl.
G09G 3/34 (2006.01)
G02F 1/1335 (2006.01)
G02F 1/13357 (2006.01)

(52) U.S. Cl.
CPC ..... *G09G 3/3426* (2013.01); *G02F 1/133603* (2013.01); *G02F 1/133612* (2021.01)

(58) Field of Classification Search
CPC ............ G09G 3/3426; G02F 1/133603; G02F 1/133612
See application file for complete search history.

(56) References Cited

U.S. PATENT DOCUMENTS 8,207,933 B2    6/2012  Shin et al.
8,982,036 B2    3/2015  Kim et al.
(Continued)

FOREIGN PATENT DOCUMENTS

CN    2829004 Y      10/2006
CN    112750397 A    5/2021
(Continued)

OTHER PUBLICATIONS

International Search Report dated Jun. 16, 2023, issued by the International Searching Authority in International Application No. PCT/KR2023/003161 (PCT/ISA/210).
(Continued)

*Primary Examiner* — Temesghen Ghebretinsae
*Assistant Examiner* — K. Kiyabu
(74) *Attorney, Agent, or Firm* — Sughrue Mion, PLLC

(57) ABSTRACT

A display apparatus includes a liquid crystal panel; a plurality of light sources configured to emit light; a substrate including a plurality of dimming blocks arranged in rows and columns, each dimming block of the plurality of dimming blocks including at least one light source of the plurality of light sources; a first driving device configured to control a driving current applied to light sources in first dimming blocks of the plurality of dimming blocks; and a second driving device configured to control a driving current applied to light sources in second dimming blocks of the plurality of dimming blocks, wherein the first dimming blocks, the second dimming blocks, the first driving device, and the second driving device are arranged on a first side of the substrate, and a layout of the first dimming blocks is different from a layout of the second dimming blocks.

15 Claims, 24 Drawing Sheets

(56) References Cited

U.S. PATENT DOCUMENTS

| | | | |
|---|---|---|---|
| 9,870,740 B2 | 1/2018 | Park et al. | |
| 11,004,408 B2 | 5/2021 | Lee et al. | |
| 11,417,287 B2 | 8/2022 | Kim et al. | |
| 11,735,101 B2 | 8/2023 | Huang et al. | |
| 2018/0188606 A1* | 7/2018 | Lee | G02F 1/133608 |
| 2020/0382740 A1 | 12/2020 | Zhou et al. | |
| 2021/0272528 A1* | 9/2021 | Goto | G02F 1/133601 |
| 2021/0333612 A1* | 10/2021 | Baek | G02F 1/133553 |
| 2021/0364861 A1* | 11/2021 | Lum | H05B 47/105 |
| 2022/0309997 A1 | 9/2022 | Hu et al. | |

FOREIGN PATENT DOCUMENTS

| | | | |
|---|---|---|---|
| CN | 112820237 A | | 5/2021 |
| CN | 112863452 A | | 5/2021 |
| JP | 2010-54793 A | | 3/2010 |
| JP | 2011-9564 A | | 1/2011 |
| KR | 10-2009-0028124 A | | 3/2009 |
| KR | 10-2011-0057506 A | | 6/2011 |
| KR | 10-2011-0059163 A | | 6/2011 |
| KR | 20110059163 A | * | 6/2011 |
| KR | 10-2016-0032758 A | | 3/2016 |
| KR | 10-2020-0118735 A | | 10/2020 |
| KR | 10-2361974 B1 | | 2/2022 |

OTHER PUBLICATIONS

Written Opinion dated Jun. 16, 2023, issued by the International Searching Authority in International Application No. PCT/KR2023/003161 (PCT/ISA/237).

* cited by examiner

DISPLAY APPARATUS

CROSS-REFERENCE TO RELATED APPLICATIONS

This application is a bypass continuation application of International Application No. PCT/KR2023/003161, filed on Mar. 8, 2023, which is based on and claims priority to Korean Patent Application No. 10-2022-0069793, filed on Jun. 8, 2022, in the Korean Intellectual Property Office, the disclosures of which are incorporated by reference herein in their entireties.

BACKGROUND

1. Field

The disclosure relates to a display apparatus, and more particularly, to a display apparatus which performs local dimming.

2. Description of Related Art

In general, a display apparatus is a type of an output device for displaying obtained or stored electrical information for a user by converting the electrical information to visual information, and is used in various fields such as homes or work places.

There are many different display apparatuses such as monitor devices connected to personal computers (PCs) or server computers, portable computer systems, Global Positioning System (GPS) terminals, general television sets, Internet protocol televisions (IPTVs), portable terminals, e.g., smart phones, tablet PCs, personal digital assistants (PDAs), and cellular phones, any other display device for reproducing images like advertisements or films, or other various kinds of audio/video systems.

The display apparatus (e.g., a self-luminous display or a non-luminous display) includes a light source device to convert an electrical signal to a visual signal, and the light source device includes a plurality of light sources capable of separately emitting light. The light source includes, for example, a light-emitting diode (LED) or an organic LED (OLED).

A local dimming technology is applied to the light source device (e.g., a backlight unit) of the non-luminous display to enhance image contrast ratios. The plurality of light sources may be divided into multiple dimming blocks, and a driving device may control a driving current applied to light sources included in one or more dimming blocks.

In this case, when the number of dimming blocks (specifically, the number of light sources) that may be driven by a driving device is fixed, some driving circuits included in driving devices may be deactivated.

Provided is a display apparatus capable of minimizing the number of driving devices in a set standard.

SUMMARY

According to an aspect of the disclosure, a display apparatus includes: a liquid crystal panel; a plurality of light sources configured to emit light; a substrate including a plurality of dimming blocks arranged in rows and columns, each dimming block of the plurality of dimming blocks including at least one light source of the plurality of light sources; a first driving device configured to control a driving current applied to light sources in first dimming blocks of the plurality of dimming blocks; and a second driving device configured to control a driving current applied to light sources in second dimming blocks of the plurality of dimming blocks, wherein the first dimming blocks, the second dimming blocks, the first driving device, and the second driving device are arranged on a first side of the substrate, and a layout of the first dimming blocks is different from a layout of the second dimming blocks.

A number of rows in which the first dimming blocks are arranged may be different from a number of rows in which the second dimming blocks are arranged.

A number of columns in which the first dimming blocks are arranged may be different from a number of columns in which the second dimming blocks are arranged.

The display apparatus may further include a dimming driver configured to control the first driving device and the second driving device, each of the first driving device and the second driving device may be configured to receive a scan signal and a dimming signal from the dimming driver, and a number of pins of the first driving device for receiving the scan signal may be different from a number of pins of the second driving device for receiving the scan signal.

The display apparatus may further include a dimming driver configured to control the first driving device and the second driving device, each of the first driving device and the second driving device may be configured to receive a scan signal and a dimming signal from the dimming driver, and a number of pins of the first driving device for receiving the dimming signal may be different from a number of pins of the second driving device for receiving the dimming signal.

A number of rows in which the first dimming blocks are arranged may be different from a number of columns in which the second dimming blocks are arranged, and a number of columns in which the first dimming blocks are arranged may be the same as a number of rows in which the second dimming blocks are arranged.

The first dimming blocks may be arranged in a row, and the second dimming blocks may be arranged in a column.

The first driving device may be configured to control a driving current applied to light sources in four first dimming blocks of the first dimming blocks arranged in a row, and the second driving device may be configured to control a driving current applied to light sources in four second dimming blocks of the second dimming blocks arranged in a column.

A number of the first dimming blocks may be different from a number of the second dimming blocks.

Light sources in each of the plurality of dimming blocks are connected in series.

The first driving device may be disposed between the first dimming blocks, and the second driving device may be disposed between the second dimming blocks.

A relative position of the first driving device in the first dimming blocks may be different from a relative position of the second driving device in the second dimming blocks.

Each of the first driving device and the second driving device may include: a first transistor; a capacitor connected to a control terminal of the first transistor; and a second transistor connected to the control terminal of the first transistor.

Each of the plurality of light sources may include: a light-emitting diode (LED) provided on the substrate in a chip on board (COB) method; and an optical dome having a cross-section shaped like a bow or a semicircle.

An intensity of a first light beam emitted from the LED in a first direction perpendicular to the substrate may be smaller than an intensity of a second light beam emitted from the LED in a second direction different from the first direction.

According to an aspect of the disclosure, a light source apparatus includes: a plurality of light sources configured to emit light; a substrate including a plurality of operation areas on a first side of the substrate, each operation area of the plurality of operation areas including a plurality of dimming blocks arranged in at least one of at least one row and at least one column, and each dimming block of the plurality of dimming blocks including at least one light source of the plurality of light sources; a first driving device configured to control a driving current applied to light sources in first dimming blocks in a first operation area of the plurality of operation areas; and a second driving device configured to control a driving current applied to light sources in second dimming blocks in a second operation area of the plurality of operation areas, wherein an arrangement of the first dimming blocks in the first operation area may be different from an arrangement of the second dimming blocks in the second operation area.

A number of rows in which the first dimming blocks are arranged may be different from a number of rows in which the second dimming blocks are arranged.

A number of columns in which the first dimming blocks are arranged may be different from a number of columns in which the second dimming blocks are arranged.

The light source apparatus may further include a dimming driver configured to control the first driving device and the second driving device, each of the first driving device and the second driving device may be configured to receive a scan signal and a dimming signal from the dimming driver, and a number of pins of the first driving device for receiving the dimming signal from the dimming driver may be different from a number of pins of the second driving device for receiving the dimming signal from the dimming driver.

The first driving device may be disposed in the first operation area, the second driving device may be disposed in the second operation area, and a relative position of the first driving device in the first operation area may be different from a relative position of the second driving device in the second operation area.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
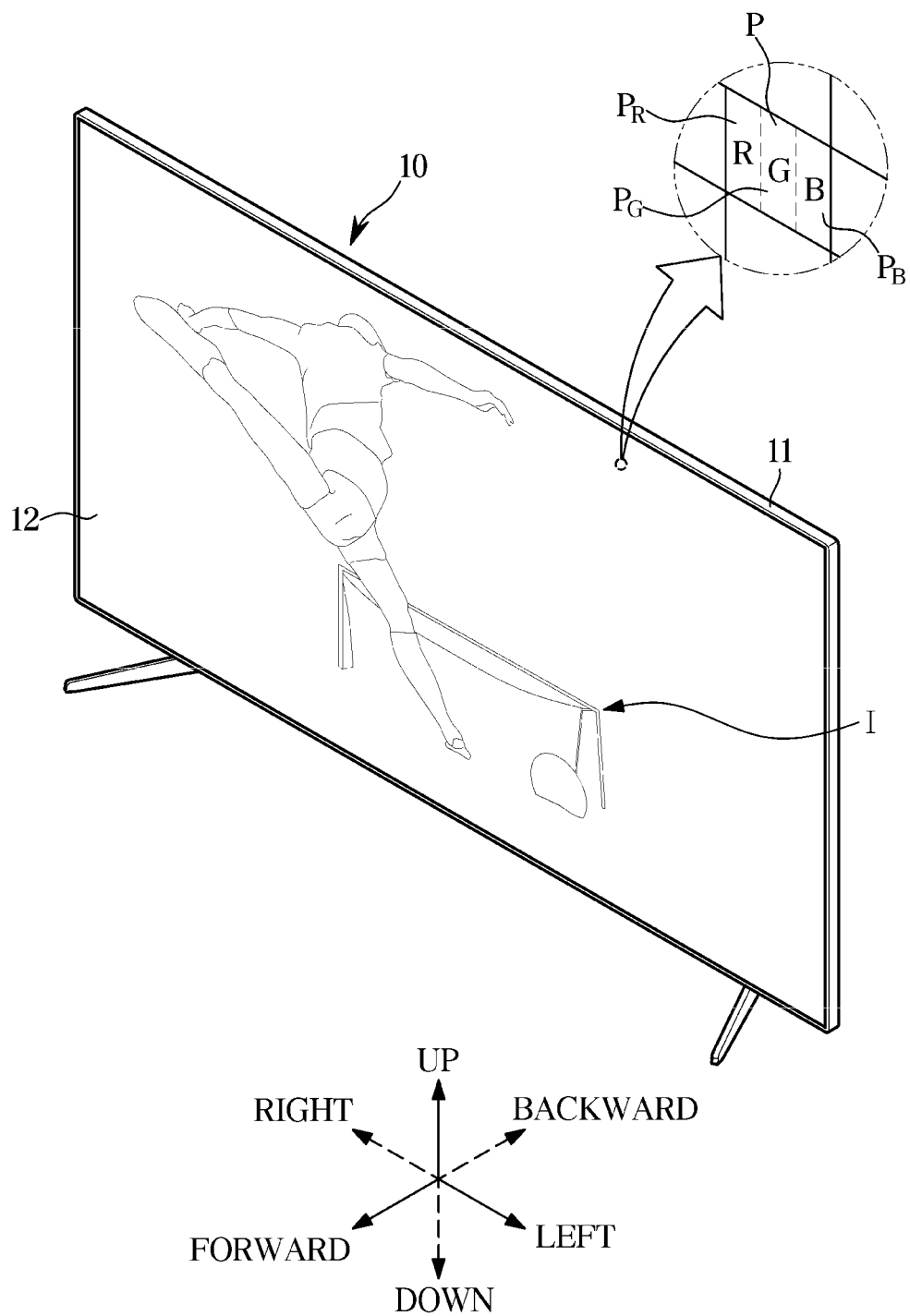
FIG. 1 illustrates an exterior of a display apparatus, according to an embodiment.

Like numerals refer to like elements throughout the specification. Not all elements of embodiments of the disclosure will be described, and description of what are commonly known in the art or what overlap each other in the embodiments will be omitted. The terms as used throughout the specification, such as "~part", "~module", "~member", "— block", etc., may be implemented in software and/or hardware, and a plurality of "~parts", "— modules", "~members", or "~blocks" may be implemented in a single element, or a single "— part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the disclosure will now be described with reference to accompanying drawings.

FIG. 1 illustrates an exterior of a display apparatus, according to an embodiment.

A display apparatus 10 is a device that is able to process image signals received from the outside and visually present the processed image. In the following description, it is assumed that the display apparatus 10 is a television (TV), but embodiments of the disclosure are not limited thereto. For example, the display apparatus 10 may be implemented in various forms, such as a monitor, a portable multimedia device, a portable communication device, and any device capable of visually presenting images, without being limited thereto.

The display apparatus 10 may be a large format display (LFD) installed outdoors such as on a rooftop of a building or at a bus stop. The display apparatus 10 is not, however, exclusively installed outdoors, but may be installed at any place, even indoors with a lot of foot traffic, e.g., at subway stations, shopping malls, theaters, offices, stores, etc.

The display apparatus 10 may receive contents including video and audio signals from various content sources and output video and audio corresponding to the video and audio signals. For example, the display apparatus 10 may receive content data through a broadcast receiving antenna or a cable, receive content data from a content reproducing device, or receive content data from a content providing server of a content provider.

As shown in FIG. 1, the display apparatus 10 may include a main body 11 and a screen 12 for displaying an image I.

The main body 11 forms the exterior of the display apparatus 10, and components for the display apparatus 10 to display the image I or perform many different functions may be included in the main body 11. Although the main body 11 of FIG. 1 is shaped like a flat plate, it is not limited thereto. For example, the main body 11 may have the form of a curved plate.

The screen 12 may be formed on the front of the main body 11 for displaying the image I. For example, the screen 12 may display still images or moving images. The screen 12 may also display two-dimensional (2D) plane images, or three dimensional (3D) stereographic images using parallax of both eyes of the user.

The screen 12 may include, e.g., a self-luminous panel (e.g., an LED panel or an OLED panel) capable of emitting light at first hand, or a non-luminous panel (e.g., a liquid crystal panel) capable of passing or blocking light emitted from e.g., a light source device (e.g., a backlight unit).

A plurality of pixels P are formed on the screen 12, and the image I displayed on the screen 12 may be formed by the light emitted by each of the plurality of pixels $P_R$. For example, the light emitted by each of the plurality of pixels P may be combined like a mosaic into the image I on the screen 12.

The plurality of pixels P may emit light in various colors and brightnesses. Each of the plurality of pixels P may include subpixels $P_R$, $P_G$ and $P_b$ to emit different colors of light.

The subpixels $P_R$, $P_G$, and $P_B$ may include a red subpixel $P_R$ to emit red light, a green subpixel $P_G$ to emit green light, and a blue subpixel $P_B$ to emit blue light. For example, the red light may represent light having wavelengths in the range of about 620 nanometer (nm) to about 750 nm, where 1 nm is a billionth of a meter. The green light may have wavelengths in the range of about 495 nm to 570 nm. The blue light may have wavelengths in the range of about 450 nm to 495 nm.

By combination of the red light of the red subpixel $P_R$, the green light of the green subpixel $P_G$, and the blue light of the blue subpixel $P_B$, each of the plurality of pixels P may emit various brightnesses and colors of light.

Figure 2:
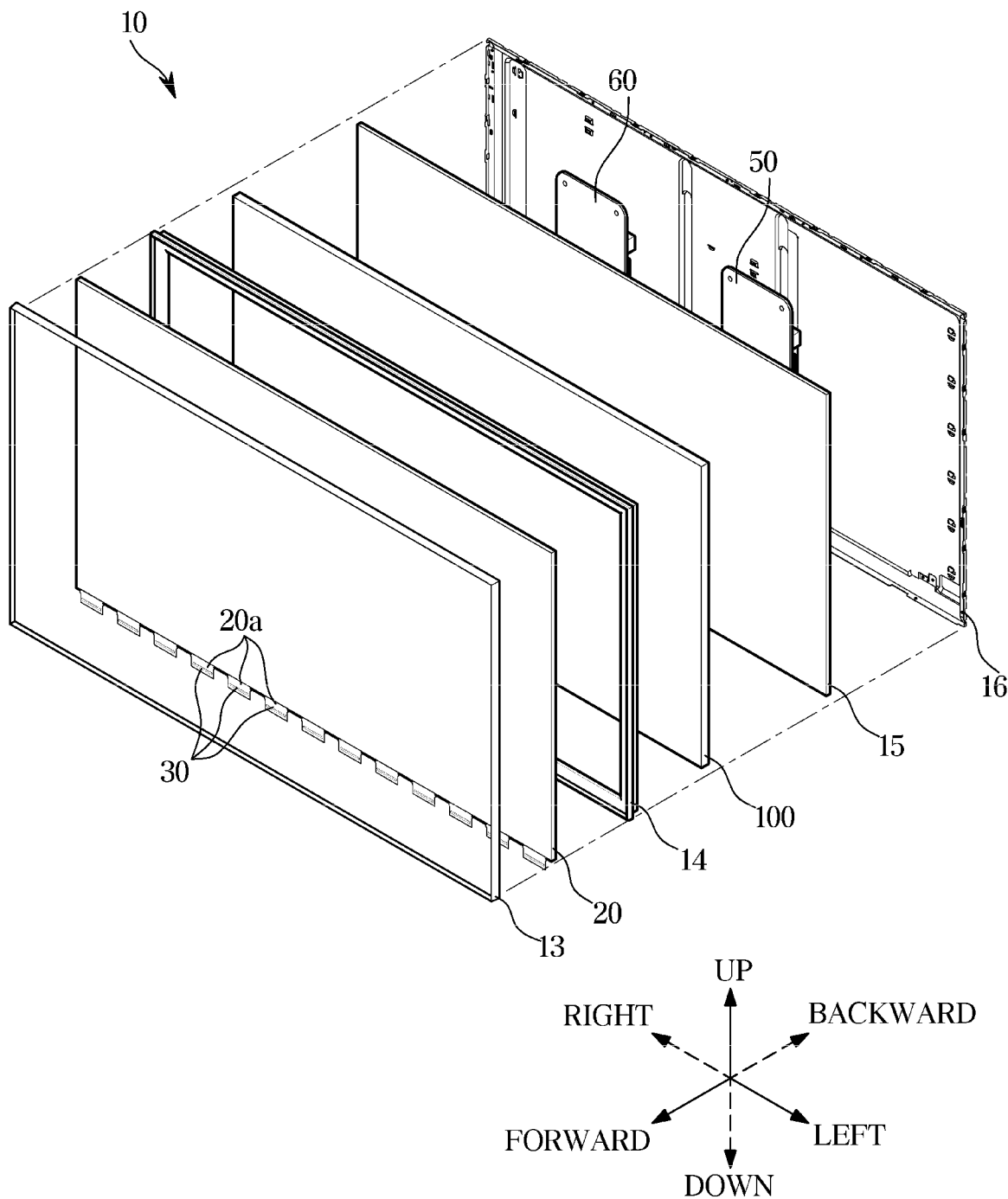
FIG. 2 illustrates a structure of a display apparatus, according to an embodiment.
Figure 3:
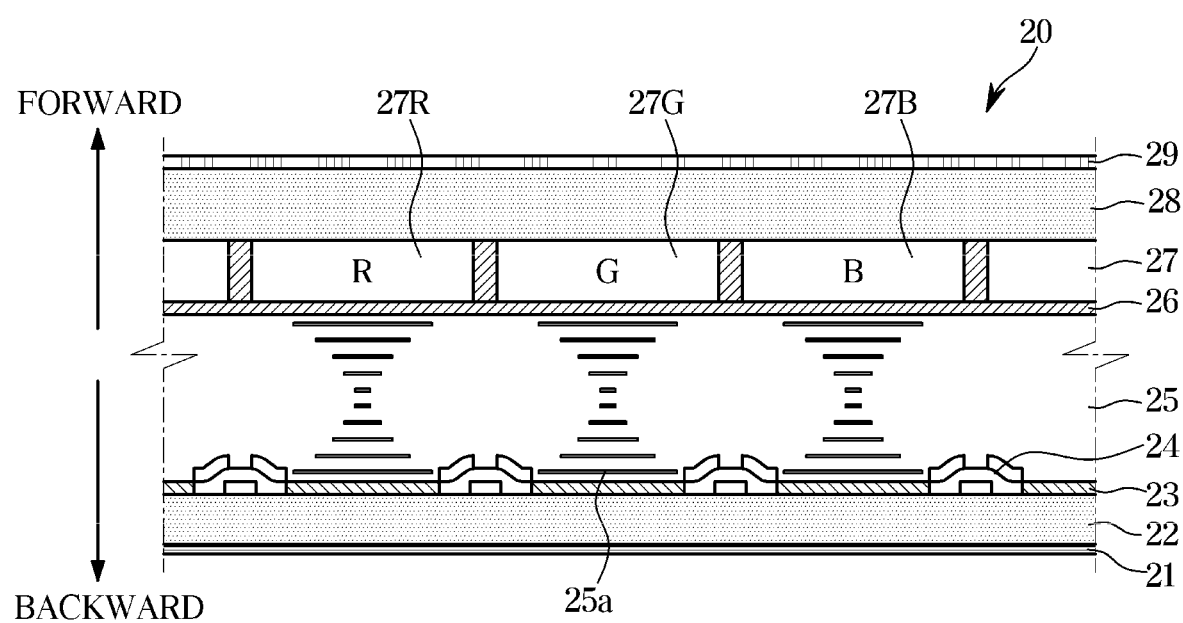
FIG. 3 illustrates a liquid crystal panel included in a display apparatus, according to an embodiment.

FIG. 2 illustrates a structure of a display apparatus, according to an embodiment. FIG. 3 illustrates a liquid crystal panel included in a display apparatus, according to an embodiment.

As shown in FIG. 2, the main body 11 may contain different kinds of components to create the image I on the screen 12.

For example, a light source device 100, which is a surface light source, a liquid crystal panel 20 for blocking or passing the light emitted from the light source device 100, a control assembly 50 for controlling operations of the light source device 100 and the liquid crystal panel 20, and a power assembly 60 for supplying power to the light source device 100 and the liquid crystal panel 20 are equipped in the may body 11. Further, the main body 11 may include a bezel 13, a frame middle mold 14, a bottom chassis 15, and a rear cover 16 to support the liquid crystal panel 20, the light source device 100, the control assembly 50, and the power assembly 60.

The light source device 100 may include point light sources for emitting monochromatic light or white light. The light source device 100 may refract, reflect, and diffuse the light emitted from the point light sources to convert the light to uniform surface light. In this way, the light source device 100 may emit the uniform surface light in a forward direction by refracting, reflecting and scattering the light emitted from the point light source.

The light source device 100 will now be described in more detail.

The liquid crystal panel 20 is arranged in front of the light source device 100 to block or pass light emitted from the light source device 100 to form the image I.

The front surface of the liquid crystal panel 20 may form the screen 12 of the display apparatus 10, and the liquid crystal panel 20 may include the plurality of pixels P. Each of the plurality of pixels P of the liquid crystal panel 20 may block or pass the light from the light source device 100 separately. The light that has passed through the plurality of pixels P may form the image I displayed on the screen 12.

For example, as shown in FIG. 3, the liquid crystal panel 20 may include a first polarizer film 21, a first transparent substrate 22, a pixel electrode 23, a thin film transistor (TFT)

24, a liquid crystal layer 25, a common electrode 26, a color filter 27, a second transparent substrate 28, and a second polarizer film 29.

The first transparent substrate 22 and the second transparent substrate 28 may securely support the pixel electrode 23, the TFT 24, the liquid crystal layer 25, the common electrode 26, and the color filter 27. The first and second transparent substrates 22 and 28 may be formed of tempered glass or transparent resin.

The first polarizer film 21 and the second polarizer film 29 are arranged on outer sides of the first and second transparent substrates 22 and 28. The first and second polarizer films 21 and 29 may each pass particularly polarized light while blocking (reflecting or absorbing) differently polarized light. For example, the first polarizer film 21 may pass polarized light of a first direction while blocking (reflecting or absorbing) differently polarized light. Further, the second polarizer film 29 may pass polarized light of a second direction while blocking (reflecting or absorbing) differently polarized light. The first and second directions may be perpendicular to each other. As a result, the polarized light that has passed the first polarizer film 21 may not pass the second polarizer film 29.

The color filter 27 may be arranged on the inner side of the second transparent substrate 28. The color filter 27 may include, for example, a red color filter 27R for passing red light, a green color filter 27G for passing green light, and a blue color filter 27B for passing blue light. Further, the red, green, and blue color filters 27R, 27G, and 27B may be arranged side by side. An area occupied by the color filter 27 corresponds to the pixel P as described above. An area occupied by the red color filter 27R corresponds to the red subpixel $P_R$, an area occupied by the green color filter 27G corresponds to the green subpixel $P_G$, and an area occupied by the blue color filter 27B corresponds to the blue subpixel $P_B$.

The pixel electrode 23 may be arranged on the inner side of the first transparent substrate 22, and the common electrode 26 may be arranged on the inner side of the second transparent substrate 28. The pixel electrode 23 and the common electrode 26 are formed of an electrically conductive metal material, and may produce an electric field to change the layout of liquid crystal molecules 115a that form the liquid crystal layer 25, which will be described below.

The thin film transistor (TFT) 24 is arranged on the inner side of the first transparent substrate 22. The TFT 24 may pass or block the current flowing in the pixel electrode 23. For example, depending on whether the TFT 24 is turned on (closed) or turned off (opened), an electric field may be formed or removed from between the pixel electrode 23 and the common electrode 26.

The liquid crystal layer 25 may be formed between the pixel electrode 23 and the common electrode 26 and filled with liquid crystal molecules 25a. The liquid crystals may be in an intermediate state between solid (crystal) and fluid. The liquid crystal layer 25 may reveal an optical property according to a change in electric field. For example, the liquid crystal layer 25 may have varying directions of arrangement of molecules that form the liquid crystal layer, according to a change in electric field. Consequently, the optical property of the liquid crystal layer 25 may be changed according to whether there is an electric field passing the liquid crystal layer 25.

A cable 20a for transmitting image data to the liquid crystal panel 20 and a display driver integrated circuit (DDI) 30 (hereinafter, called a 'panel driver') for processing digital image data to output an analog image signal are provided on one side of the liquid crystal panel 20.

The cable 20a may electrically connect the control assembly 50 and the power assembly 60 to the panel driver 30 and further electrically connect the panel driver 30 to the liquid crystal panel 20. The cable 20a may include, e.g., a flexible flat cable that is bendable or a film cable.

The panel driver 30 may receive image data and power from the control assembly 50/power assembly 60 through the cable 20a. The panel driver 30 may also provide image data and a driving current to the liquid crystal panel 20 through the cable 20a.

Further, the cable 20a and the panel driver 30 may be integrally implemented as a film cable, a chip on film (COF), a table carrier package (TCP), etc. In other words, the panel driver 30 may be arranged on the cable 20a. It is not, however, limited thereto, and the panel driver 30 may be arranged on the liquid crystal panel 20.

The control assembly 50 may include a control circuit for controlling operations of the liquid crystal panel 20 and the light source device 100. For example, the control circuit may process a video signal and/or an audio signal received from an external content source. The control circuit may transmit image data to the liquid crystal panel 20, and transmit dimming data to the light source device 100.

The power assembly 60 may include a power circuit for supplying power to the liquid crystal panel 20 and the light source device 100. The power circuit may supply power to the light source device 100 to output surface light. The power circuit may supply power to the liquid crystal panel 20 so that the liquid crystal panel 20 may block or pass the light from the light source device 100.

The control assembly 50 and the power assembly 60 may be implemented with printed circuit boards (PCBs) and various circuits mounted on the PCBs. For example, the power circuit may include a power circuit board, and a capacitor, a coil, a resistor, a processor, etc., which are mounted on the power circuit board. Further, the control circuit may include a control circuit board with a memory and a processor mounted thereon.

Figure 4:
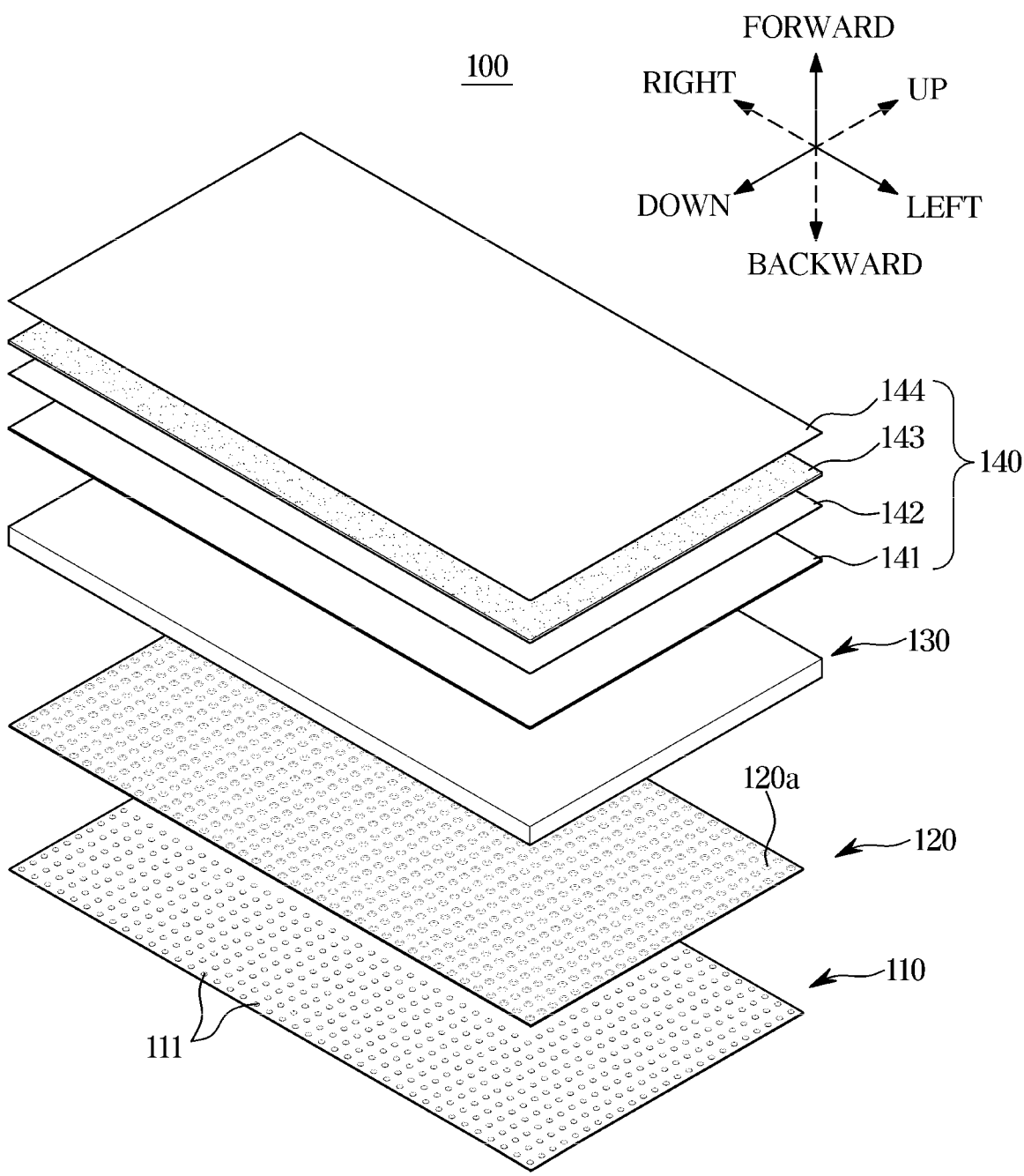
FIG. 4 illustrates a light source device included in a display apparatus, according to an embodiment.
Figure 5:
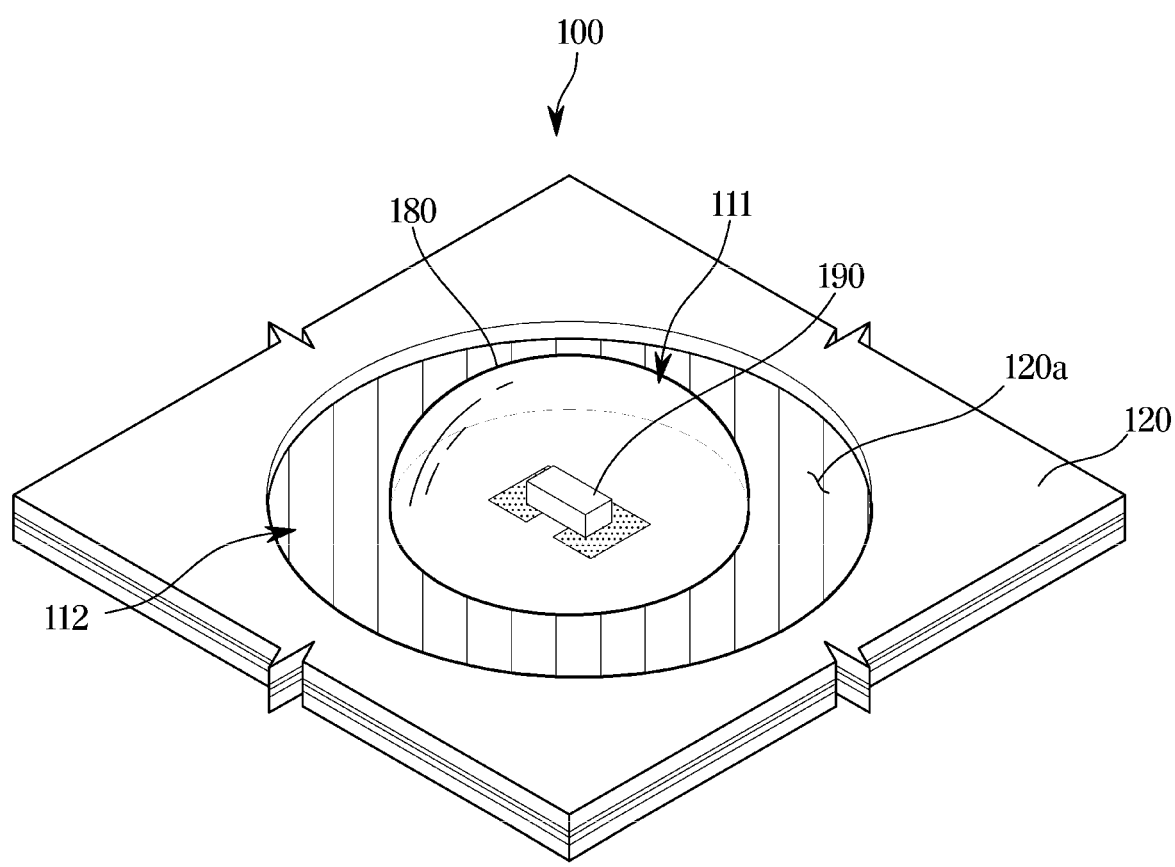
FIG. 5 illustrates a light source included in a light source device, according to an embodiment.

FIG. 4 illustrates a light source device included in a display apparatus, according to an embodiment. FIG. 5 illustrates a light source included in a light source device, according to an embodiment.

Referring to FIG. 4, the light source device 100 may include a light source module 110 for generating light, a reflection sheet 120 for reflecting light, a diffuser plate 130 for uniformly diffusing light, and an optical sheet 140 for enhancing brightness of output light.

The light source module 110 may include a plurality of light sources 111 for emitting light, and a substrate 112 for supporting and fixing the plurality of light sources 111.

The plurality of light sources 111 may be arranged in a predefined pattern to emit light with uniform brightness. The plurality of light sources 111 may be arranged such that a light source is equidistant from its neighboring light sources.

For example, as shown in FIG. 4, the plurality of light sources 111 may be arranged in rows and columns. Accordingly, the plurality of light sources 111 may be arranged such that neighboring four light sources form substantially a square. Furthermore, a light source is located to be adjacent to four other light sources, and the distances between the light source and the four neighboring light sources may be substantially the same.

Alternatively, the plurality of light sources 111 may be arranged such that neighboring three light sources form substantially a triangle. In this case, a light source may be arranged to be adjacent to six other light sources. The distances between the light source and the six neighboring light sources are substantially the same.

The arrangement of the plurality of light sources 111 is not, however, limited thereto, and the plurality of light sources 111 may be arranged in various ways to emit light in even brightness.

The plurality of light sources 111 may include a device capable of emitting monochromatic light (light having a wavelength in a particular range or light having a peak wavelength, e.g., blue light) or white light (light having a plurality of peak wavelengths, e.g., a mixture of red light, green light, and blue light) to various directions when powered.

Each of the plurality of light sources 111 may include an LED 190 and an optical dome 180.

The thinner the thickness of the display apparatus 10, the thinner the thickness of the light source device 100. To make the light source device 100 become thinner, each of the plurality of light sources 111 gets thinner and the structure becomes simpler.

The LED 190 may be attached directly to the substrate 112 in a method of chip on board (COB). For example, the light source 111 may include the LED 190 with an LED chip or an LED die attached directly to the substrate 112 without extra packaging.

The LED 190 may be manufactured in a flip chip type. The LED 190 of the flip chip type may not use an intermediate medium such as a metal lead (wire) or a ball grid array (BGA) to attach the LED, which is a semiconductor device, to the substrate 112, but may fuse an electrode pattern of the semiconductor device onto the substrate 112 as it is. This may make it possible for the light source 111 including the LED 190 of the flip chip type to become smaller by omitting the metal lead (wire) or the ball grid array.

Although the LED 190 is described above as having a flip chip type directly fused onto the substrate 112 in the COB method, the light source 111 is not limited to the flip chip type LED. For example, the light source 111 may include a package type of LED.

The optical dome 180 may cover the LED 190. The optical dome 180 may prevent or suppress damage to the LED 190 due to an external mechanical action and/or chemical action.

The optical dome 180 may be shaped like, for example, a dome obtained by cutting a sphere without including the center or a semi-sphere obtained by cutting the sphere with the center included. A vertical cross-section of the optical dome 180 may have, e.g., an arcuate form or a semi-circular form.

The optical dome 180 may be formed of silicon or epoxy resin. For example, melted silicon or epoxy resin is discharged onto the LED 190 through e.g., a nozzle, and then hardened to form the optical dome 180.

Accordingly, depending on viscosity of the fluid silicon or epoxy resin, the shape of the optical dome 180 may be variously changed. For example, when the optical dome 180 is manufactured with silicon with a thixotropic index of about 2.7 to 3.3 (e.g., 3.0), the optical dome 180 having a dome ratio of about 0.25 to 0.31 (e.g., 0.28) representing a ratio of a dome height to a diameter of the bottom side of the dome (dome height/diameter of bottom side) may be formed.

The optical dome 180 may be optically transparent or translucent. Light emitted from the LED 190 may pass through the optical dome 180 to the outside.

In this case, the dome-shaped optical dome 180 may refract the light like a lens. For example, the light emitted from the LED 190 may be refracted and dispersed by the optical dome 180.

As such, the optical dome 180 may not only protect the LED 190 from an external mechanical action and/or chemical action or electrical action, but also scatter the light emitted from the LED 190.

Although the optical dome 180 is described as being dome-shaped, the light source 111 is not limited to a light source including the optical dome 180. For example, the light sources 111 may include a lens for diffusing the light emitted from the LED.

The substrate 112 may fix the plurality of light sources 111 to prevent the light sources 111 from being moved. In addition, the substrate 112 may supply power to each of the light sources 111 so that the light source 111 may emit light.

The substrate 112 may secure the plurality of light sources 111. The substrate 112 may be formed of a synthetic resin, tapered glass or a PCB with conductive power supply lines formed therein to supply power to the light sources 111.

The reflection sheet 120 may reflect light emitted from the plurality of light sources 111 to a forward direction or to a nearly forward direction.

A plurality of through holes 120a are formed on the reflection sheet 120 at positions respectively matching the plurality of light sources 111 of the light source module 110. Further, the plurality of light sources 111 of the light source module 110 may pass through the through holes 120a and protrude forward from the reflection sheet 120. Accordingly, the plurality of light sources 111 may emit light from the front of the reflection sheet 120. The reflection sheet 120 may reflect the light emitted toward the reflection sheet 120 from the plurality of light sources 111 toward the diffuser plate 130.

The diffuser plate 130 may be arranged in front of the light source module 110 and the reflection sheet 120. The diffuser plate 130 is able to uniformly diffuse the light emitted from the plurality of light sources 111 of the light source module 110.

As described above, the plurality of light sources 111 are equidistantly arranged on the rear side of the light source device 100. This may cause non-uniformity in brightness depending on the locations of the plurality of light sources 111.

To avoid the non-uniformity in brightness due to the plurality of light sources 111, the diffuser plate 130 may diffuse the light emitted from the plurality of light sources 111 within the diffuser plate 130. In other words, the diffuser plate 130 may uniformly emit non-uniform light forward from the plurality of light sources 111.

The optical sheet 140 may include various sheets to improve brightness and uniformity in brightness. For example, the optical sheet 140 may include a light conversion sheet 141, a diffuser sheet 142, a prism sheet 143, and a reflective polarizer sheet 144, etc.

The optical sheet 140 is not limited to the sheets or films as illustrated in FIG. 4, and may further include other various sheets or films such as protective sheets.

Figure 6:
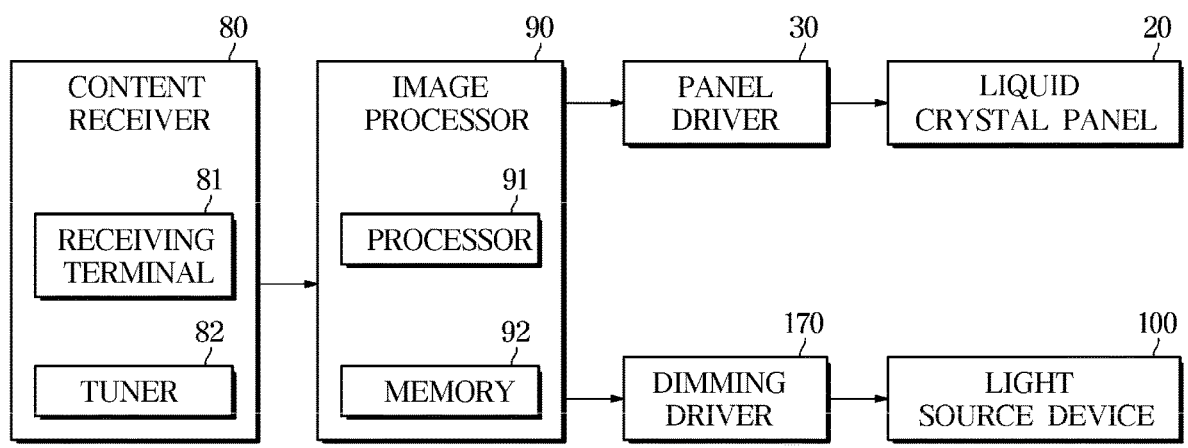
FIG. 6 illustrates a configuration of a display apparatus, according to an embodiment.
Figure 7:
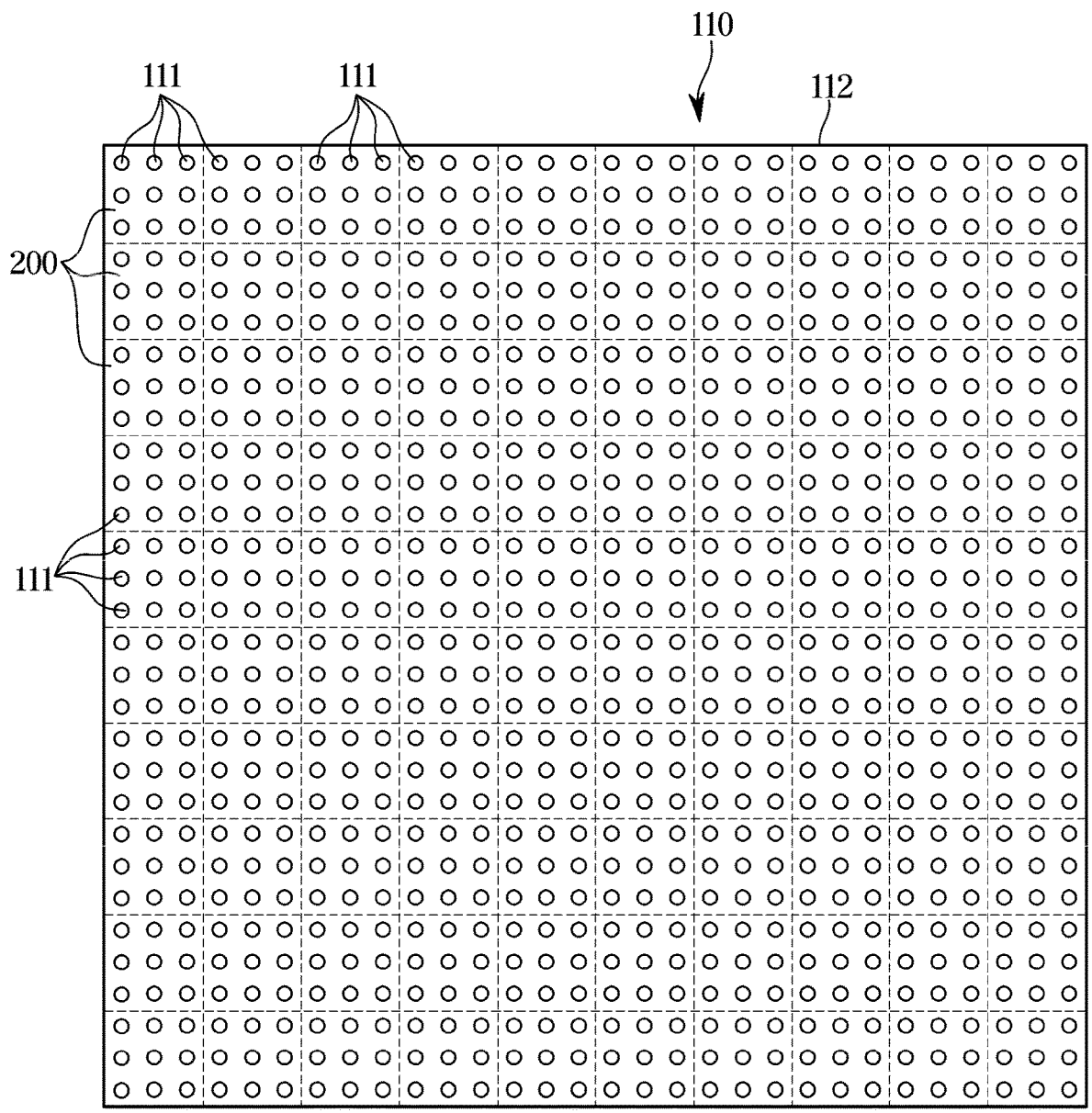
FIG. 7 illustrates dimming blocks of a light source device included in a display apparatus, according to an embodiment.
Figure 8:
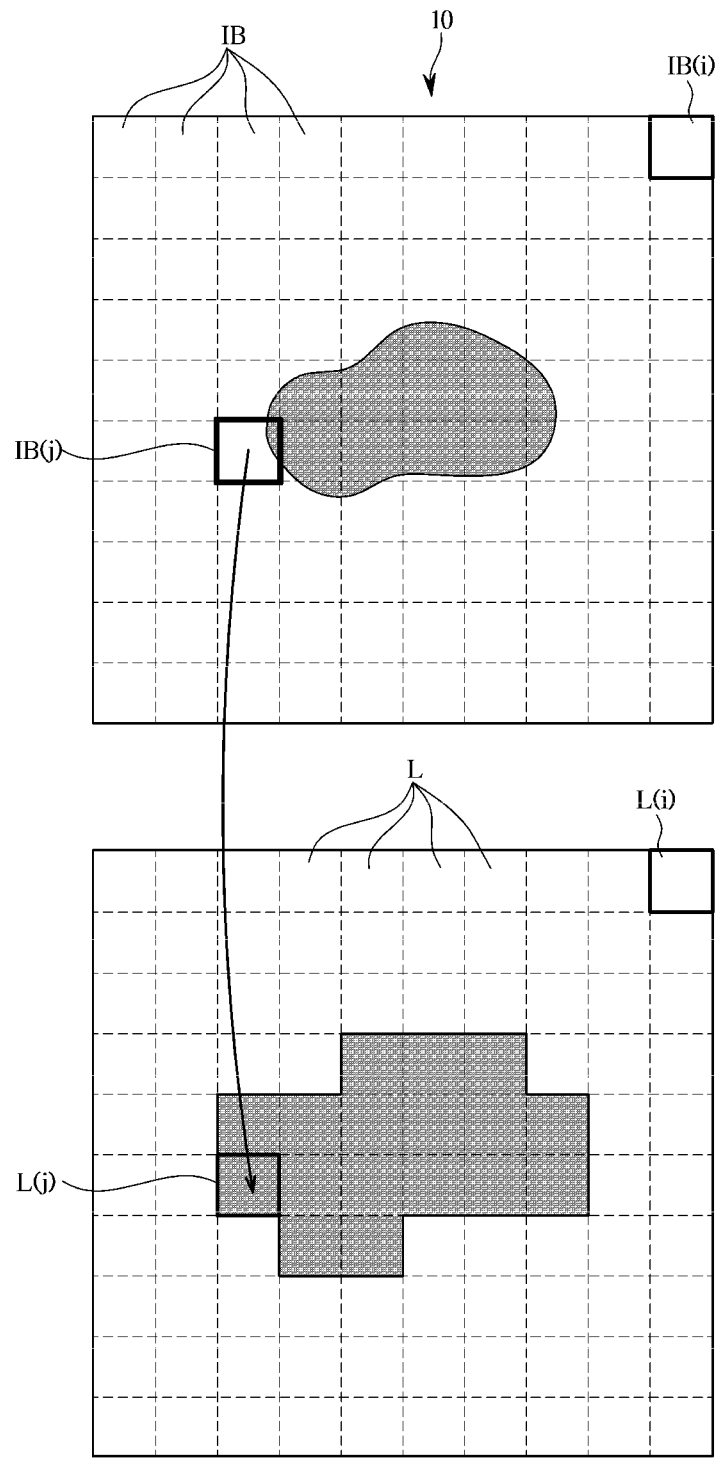
FIG. 8 illustrates an example in which a display apparatus converts image data to dimming data, according to an embodiment.

FIG. 6 illustrates a configuration of a display apparatus, according to an embodiment. FIG. 7 illustrates dimming blocks of a light source device included in a display apparatus, according to an embodiment. FIG. 8 illustrates an example in which a display apparatus converts image data to dimming data, according to an embodiment.

As shown in FIG. 6, the display apparatus 10 includes a content receiver 80, an image processor 90, a panel driver 30, the liquid crystal panel 20, a dimming driver 170, and the light source device 100.

The content receiver 80 may include receiving terminals 81 and a tuner 82 for receiving contents including video signals and/or audio signals from content sources.

The receiving terminals 81 may receive video signals and audio signals from the content sources through a cable. For example, the receiving terminals 81 may include a component (YPbPr/RGB) terminal, a composite video blanking and sync (CVBS) terminal, an audio terminal, a high-definition multimedia interface (HDMI) terminal, a universal serial bus (USB) terminal, etc.

The tuner 82 may receive broadcast signals through a broadcast receiving antenna or a cable. The tuner 82 may also extract a broadcast signal of a channel selected by the user from among the broadcast signals. For example, the tuner 82 may pass a broadcast signal having a frequency corresponding to a channel selected by the user among the broadcast signals received through the broadcast receiving antenna or the cable, and block broadcast signals having the other frequencies.

As such, the content receiver 80 may receive video signals and audio signals from content sources through the receiving terminals 81 and/or the tuner 82. The content receiver 80 may output the video signals and/or audio signals received through the receiving terminals 81 and/or the tuner 82 to the image processor 90.

The image processor 90 may include a processor 91 for processing image data and a memory 92 for storing data and a program for processing image data.

The memory 92 may store a program and data for processing video signals and/or audio signals. The memory 92 may also temporarily store data generated in processing the video signals and/or audio signals.

The memory 92 may include a non-volatile memory such as a Read Only Memory (ROM), a flash memory, and/or the like, and a volatile memory such as a static random access memory (SRAM), a dynamic RAM (DRAM), or the like.

The processor 91 may receive the video signal and/or the audio signal from the content receiver 80. The processor 91 may decode the video signal to image data. The processor 91 may create dimming data from the image data. The processor 91 may also output the image data and the dimming data to the panel driver 30 and the dimming driver 170, respectively.

As such, the image processor 90 may generate image data and dimming data from a video signal obtained by the content receiver 80. Further, the image processor 90 may transmit the image data and the dimming data to the liquid crystal panel 20 and the light source device 100, respectively.

The image data may include information about an intensity of light transmitted by each of the plurality of pixels (or a plurality of subpixels) included in the liquid crystal panel 20. The image data may be provided to the liquid crystal panel 20 through the panel driver 30.

The liquid crystal panel 20 includes a plurality of pixels capable of passing or blocking light, and the plurality of pixels are arranged in the form of a matrix. In other words, the plurality of pixels may be arranged in a plurality of rows and a plurality of columns.

The panel driver 30 may receive image data from the image processor 90. The panel driver 30 may drive the liquid crystal panel 20 according to the image data. Specifically, the panel driver 30 may convert the image data, which is a digital signal, (hereinafter, referred to as digital image data) to an analog image signal, which is an analog voltage signal. The panel driver 30 may provide the converted analog image signal to the liquid crystal panel 20. According to the analog image signal, an optical property (e.g., light transmittance) of the plurality of pixels included in the liquid crystal panel 20 may be changed.

The panel driver 30 may include, for example, a timing controller, a data driver, and a scan driver, etc.

The timing controller may receive the image data from the image processor 90. The timing controller may output the image data and a driving control signal to the data driver and the scan driver. The driving control signal may include a scan control signal and a data control signal. The scan control signal and the data control signal may be used to control operations of the scan driver and the data driver, respectively.

The scan driver may receive the scan control signal from the timing controller. The scan driver may activate one of the plurality of rows in the liquid crystal panel 20 according to the scan control signal. In other words, the scan driver may convert a state of pixels included in a row among the plurality of pixels arranged in a plurality of rows and a plurality of columns into a state of being able to receive analog image signals. In this case, other pixels than the pixels for which input is activated by the scan driver may be unable to receive analog image signals.

The data driver may receive image data and a data control signal from the timing controller. The data driver may output the image data to the liquid crystal panel 20 according to the data control signal. For example, the data driver may receive digital image data from the timing controller. The data driver may convert the digital image data to an analog image signal. The data driver may also provide the analog image signal to pixels included in a row, which are input-activated by the scan driver. In this case, pixels for which input is activated by the scan driver may receive analog image signals. The optical property (e.g., light transparency) of the pixels for which input is activated is changed by the received analog image signal.

As such, the panel driver 30 may drive the liquid crystal panel 20 according to the image data. Accordingly, an image corresponding to the image data may be displayed on the liquid crystal panel 20.

Further, the dimming data may include information about an intensity of light emitted by each of the plurality of light sources (or a plurality of dimming blocks) included in the light source device 100. The dimming data may be provided to the light source device 100 through the dimming driver 170.

The light source device 100 may include the plurality of light sources 111 that emit light. The plurality of light sources 111 are arranged in the form of a matrix. In other words, the plurality of light sources 111 may be arranged in a plurality of rows and a plurality of columns.

The light source device 100 may be divided into a plurality of dimming blocks 200. Each of the plurality of dimming blocks 200 may include at least one light source.

The light source device 100 may output surface light by diffusing light emitted from the plurality of light sources 111. The liquid crystal panel 20 may include a plurality of pixels, and control the plurality of pixels each to pass or block light. Light that has passed the plurality of pixels may form an image.

In this case, the light source device 100 may turn off a plurality of light sources corresponding to a dark portion of the image to further darken the dark portion of the image. As the dark portion of the image gets darker, a contrast ratio of the image may be enhanced.

Such operations of controlling a plurality of light sources to emit light in an area corresponding to a bright portion of the image and controlling a plurality of light sources not to emit light in an area corresponding to a dark portion of the image will now be referred to as 'local dimming'.

For local dimming, the plurality of light sources 111 included in the light source device 100 may be divided into the plurality of dimming blocks 200, as shown in FIG. 7. In FIG. 7, a total of 100 dimming blocks, which is 10×10 wide and long, are shown, but the number and arrangement of the dimming blocks is not limited to what is shown in FIG. 7.

Each of the plurality of dimming blocks 200 may include at least one light source 111. The light source device 100 may apply the same driving current to light sources belonging to the same dimming block, and the light sources belonging to the same dimming block may emit light with the same brightness. For example, the light sources belonging to the same dimming block may be connected in series and thus the same driving current may be applied to the light sources belonging to the same dimming block.

Further, the light source device 100 may further include driving circuits for controlling the driving currents applied to the light sources included in each of the plurality of dimming blocks 200. The driving circuits may be provided to correspond to the respective dimming blocks 200. In other words, the driving circuits may drive the respective dimming blocks 200.

As such, light sources belonging to a dimming block are connected in series and thus the light sources included in the dimming block are operated in unison and may integrally form a light source block.

Hence, "a driving current is applied to a dimming block" may be interpreted as having the same meaning as "the driving current is applied to light sources included in the dimming block".

In FIG. 7, the dimming blocks each including 9 light sources are shown, but the number and arrangement of the light sources included in each dimming block is not limited to what is shown in FIG. 7.

As described above, the image processor 90 may provide dimming data for local dimming to the light source device 100. The dimming data may include information about brightness of each of the plurality of dimming blocks 200. For example, the dimming data may include information regarding an intensity of light output from the light sources included in each of the plurality of dimming blocks 200.

The image processor 90 may obtain dimming data from image data.

The image processor 90 may convert the image data to dimming data in various methods. For example, as shown in FIG. 8, the image processor 90 may partition the image I from the image data into a plurality of image blocks IB. The number of the plurality of image blocks IB is the same as the number of the plurality of dimming blocks 200, and the plurality of image blocks IB may correspond to the plurality of dimming blocks 200, respectively.

The image processor 90 may obtain brightness values L of the plurality of dimming blocks 200 from the image data of the plurality of image blocks IB. Further, the image processor 90 may generate dimming data by combining the brightness values L of the plurality of dimming blocks 200.

For example, the image processor 90 may obtain the brightness value L of each of the plurality of dimming blocks 200 based on a maximum value of the brightness values of pixels included in each image block IB.

An image block includes a plurality of pixels, and image data of an image block may include image data of the plurality of pixels (e.g., red data, green data, blue data, etc.). The image processor 90 may calculate a brightness value of each of the pixels based on image data of the pixel.

The image processor 90 may determine a maximum value of the brightness values of pixels included in an image block as a brightness value of a dimming block corresponding to the image block. For example, the image processor 90 may determine a maximum value of brightness values of pixels included in an i-th image block IB(i) as a brightness value L(i) of an i-th dimming block, and determine a maximum value of brightness values of pixels included in a j-th image block IB(j) as a brightness value L(j) of a j-th dimming block.

The image processor 90 may generate dimming data by combining the brightness values of the plurality of dimming blocks 200.

The dimming driver 170 may receive dimming data from the image processor 90. The dimming driver 170 may drive the light source device 100 according to the dimming data. The dimming data may include information about brightness of each of the plurality of dimming blocks 200, or information about brightness of light sources included in each of the plurality of dimming blocks 200.

The dimming driver 170 may convert the dimming data, which is a digital voltage signal, into an analog driving current.

The dimming driver 170 may sequentially provide analog dimming signals to driving circuits corresponding to the respective dimming blocks 200 in, e.g., an active matrix scheme.

The plurality of dimming blocks 200 may be divided into a plurality of groups. The driving current may be simultaneously applied to dimming blocks belonging to the same group, and the driving current may be sequentially applied to dimming blocks belonging to different groups at different times. The dimming driver 170 may activate dimming blocks belonging to one of the plurality of groups and provide an analog dimming signal to the activated dimming blocks. Subsequently, the dimming driver 170 may activate dimming blocks belonging to another group, and provide an analog dimming signal to the activated dimming blocks.

For example, dimming blocks located in the same row may belong to the same group, and dimming blocks located in different rows may belong to different groups. The dimming driver 170 may activate dimming blocks belonging to a row and provide the analog dimming signal to the activated dimming blocks. Subsequently, the dimming driver 170 may activate inputs of dimming blocks belonging to another row, and provide the analog dimming signal to the input-activated dimming blocks.

A driving circuit for each of the dimming blocks 200 may provide an analog driving current corresponding to an analog dimming signal to the light source module 110. The analog driving current may enable the light sources 111 included in the light source module 110 to emit light. The light sources belonging to the same dimming block may emit the same intensity of light according to the dimming data. Further, light sources belonging to different dimming blocks may emit light of different intensities according to the dimming data.

The dimming driver 170 sequentially providing the analog dimming signal to the plurality of dimming blocks 200 in an active matrix scheme will now be described in detail.

Figure 9:
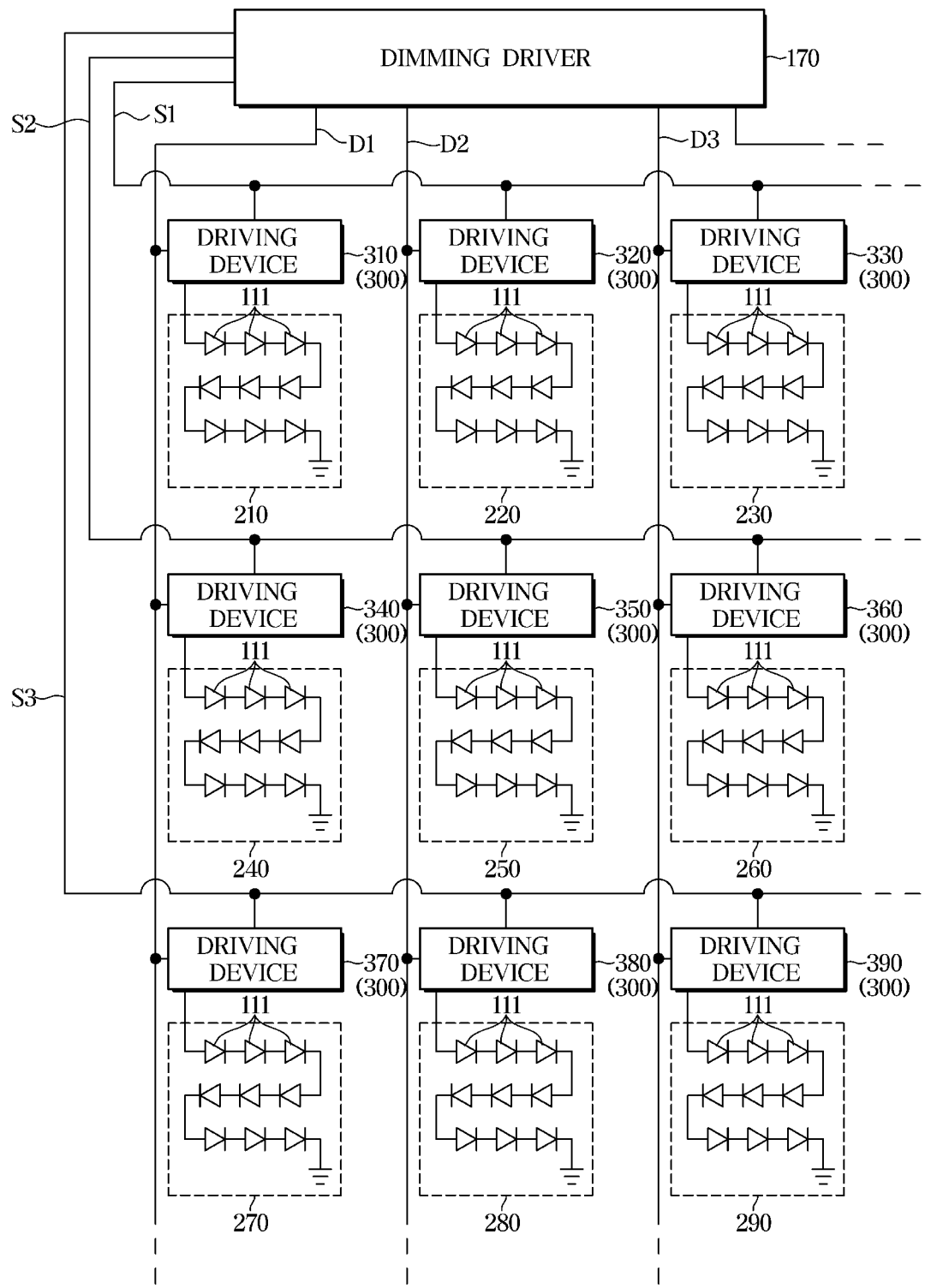
FIG. 9 illustrates a dimming driver and a light source device included in a display apparatus, according to an embodiment.
Figure 10:
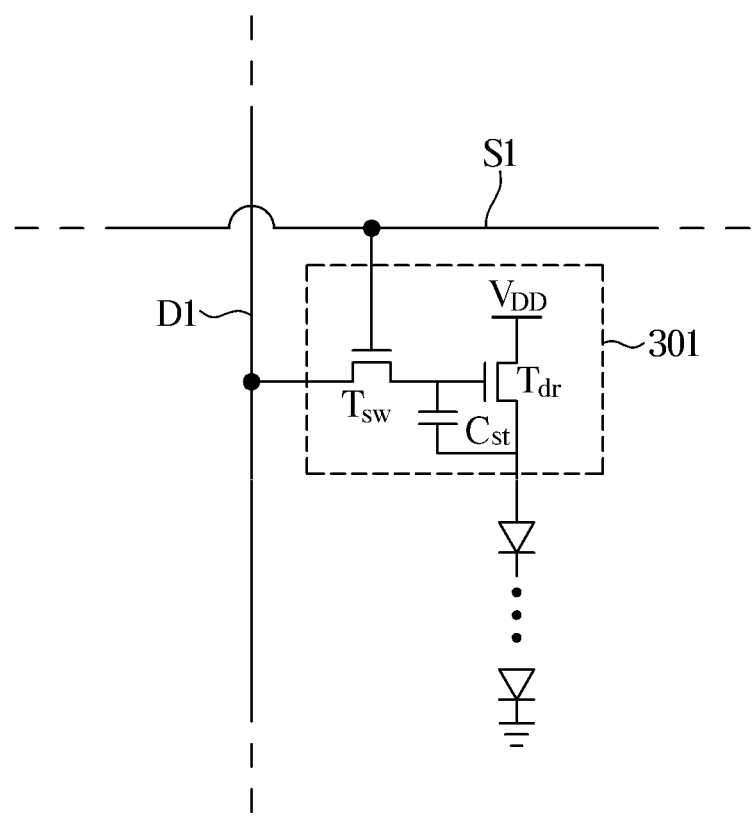
FIG. 10 illustrates a driving device included in a display apparatus, according to an embodiment.

FIG. 9 illustrates a dimming driver and a light source device included in a display apparatus, according to an embodiment. FIG. 10 shows a driving device included in a display apparatus, according to an embodiment.

Referring to FIGS. 9 and 10, the display apparatus 10 includes the dimming driver 170, a plurality of driving devices 310, 320, 330, 340, 350, 360, 370, 380 and 390, collectively 300, and the plurality of light sources 111.

The plurality of light sources 111 may each include an LED, and may be divided into a plurality of dimming blocks 210, 220, 230, 240, 250, 260, 270, 280 and 290, collectively 200. For example, light sources belonging to the same dimming block may be connected in series and thus the same driving current may be applied to the light sources.

The plurality of driving devices 300 may receive an analog dimming signal from the dimming driver 170, and may apply a driving current to the plurality of light sources 111 according to the received analog dimming signal.

As shown in FIG. 10, a plurality of light sources belonging to one dimming block may receive a current from the same driving device. For example, a plurality of light sources belonging to the first dimming block 210 may receive a driving current from the first driving device 310. A plurality of light sources belonging to the second dimming block 220 may receive a driving current from the second driving device 320. A plurality of light sources belonging to the third dimming block 230 may receive a driving current from the third driving device 330. In the same way, a plurality of light sources belonging to the n-th dimming block (e.g., 240, 250, 260, 270, 280 or 290) may receive a driving current from the n-th driving device (e.g., 340, 350, 360, 370, 380 or 390).

The driving devices 300 may receive the analog dimming signal from the dimming driver 170 and store the received analog dimming signal while being input-activated by the dimming driver 170. Further, while being input-activated, the plurality of driving devices 300 may apply a driving current corresponding to the stored analog dimming signal to the plurality of light sources.

There are a plurality of scan lines S1, S2 and S3 for providing scan signals to the plurality of driving devices 300 from the dimming driver 170, and a plurality of data lines D1, D2 and D3 for providing analog dimming signals to the plurality of driving devices 300 from the dimming driver 170.

The plurality of dimming blocks 200 may be arranged in a plurality of rows and a plurality of columns. Driving devices corresponding to dimming blocks belonging to a row may share a scan line. For example, the first driving device 310, the second driving device 320 and the third driving device 330 may share the first scan line S1, and the fourth driving device 340, the fifth driving device 350 and the sixth driving device 360 may share the second scan line S2. Further, the seventh driving device 370, the eighth driving device 380, and the ninth driving device 390 may share a third scan line S3.

Moreover, driving devices corresponding to dimming blocks belonging to the same column may share the same data line. For example, the first driving device 310, the fourth driving device 340, and the seventh driving device 370 may share the first data line D1, and the second driving device 320, the fifth driving device 350, and the eighth driving device 380 may share the second data line D2. Further, the third driving device 330, the sixth driving device 360, and the ninth driving device 390 may share the third data line D3.

The plurality of driving devices 300 may be input-activated by the scan signal of the dimming driver 170, and the input-activated driving devices may receive the analog dimming signal from the dimming driver 170.

For example, while the dimming driver 170 outputs a scan signal through the first scan line S1, the first driving device 310, the second driving device 320 and the third driving device 330 may receive analog dimming signals through the first data line D1, the second data line D2 and the third data line D3, respectively. On the other hand, the other driving devices 340, 350, 360, 370, 380 and 390 receive no analog dimming signal.

Further, while the dimming driver 170 outputs a scan signal through the second scan line S2, the fourth driving device 340, the fifth driving device 350 and the sixth driving device 360 may receive analog dimming signals through the first data line D1, the second data line D2, and the third data line D3, respectively. On the other hand, the other driving devices 310, 320, 330, 370, 380 and 390 receive no analog dimming signal.

On receiving the analog dimming signals, the plurality of driving devices 300 may store the received analog dimming signals, and may each apply a driving current to the plurality of light sources according to the stored analog dimming signal.

For example, even while the dimming driver 170 outputs a scan signal through the first scan line S1, the fourth driving device 340, the fifth driving device 350 and the sixth driving device 360 may apply driving currents to the plurality of light sources included in the fourth, fifth and sixth dimming blocks 240, 250 and 260, respectively.

Further, even while the dimming driver 170 outputs a scan signal through the second scan line S2, the first driving device 310, the second driving device 320 and the third driving device 330 may apply driving currents to the plurality of light sources included in the first, second and third dimming blocks 210, 220 and 230, respectively.

According to the active matrix scheme based operation, the plurality of driving devices 300 may sequentially receive analog dimming signals from the dimming driver 170, and may apply a driving current to a plurality of light sources even while in an input-deactivated state in which no analog dimming signal is received from the dimming driver 170.

Further, according to the active matrix scheme based operation, the number of pins of the dimming driver 170 to provide analog dimming signals to the plurality of dimming blocks 200 is reduced. Moreover, the number of signal lines to provide analog dimming signals to the plurality of dimming blocks 200 from the dimming driver 170 is reduced. Accordingly, the number of dimming blocks may increase without limit to the number of pins of the dimming driver 170.

The plurality of driving devices 300 may include various topology circuits to perform the active matrix scheme based operation.

For example, as shown in FIG. 10, each of the plurality of driving devices 300 may include a one-capacitor two-transistor (1C2T) topology circuit.

Each of the plurality of driving devices 300 may include a driving circuit 301 including a driving transistor Tdr, a switching transistor Tsw, and a storage capacitor Cst.

The driving transistor Tdr includes an input terminal, an output terminal, and a control terminal. The input terminal of the driving transistor Tdr may be connected to a power source $V_{DD}$, and the output terminal may be connected to a plurality of light sources. The driving transistor Tdr may apply a driving current to the plurality of light sources based on a voltage at the control terminal.

The storage capacitor Cst is provided between the output terminal and the control terminal of the driving transistor Tdr. The storage capacitor Cst may output a constant voltage by storing input charges. The driving transistor Tdr may apply a driving current to the plurality of light sources based on a voltage output by the storage capacitor Cst.

The switching transistor Tsw also includes an input terminal, an output terminal, and a control terminal. The input terminal of the switching transistor Tsw may be connected to the data line D1 or D2, and the output terminal of the switching transistor Tsw may be connected to the control terminal of the driving transistor Tdr. The control terminal of the switching transistor Tsw may be connected to the scan line S1 or S2.

The switching transistor Tsw may be turned on by a scan signal of the scan line S1, S2 or S3, and may deliver an analog dimming signal of the data line D1, D2 or D3 to the storage capacitor Cst and the driving transistor Tdr. The analog dimming signal of the data line D1, D2 or D3 is input to the control terminal of the driving transistor Tdr, and the driving transistor Tdr may apply a driving current corresponding to the analog dimming signal to a plurality of light sources. The storage capacitor Cst may store charges of the analog dimming signal, and output a voltage corresponding to the analog dimming signal.

After the storage capacitor Cst stores charges of the analog dimming signal, even when the inputting of the scan signal is stopped and the switching transistor Tsw is turned off, the storage capacitor Cst may still output a voltage corresponding to the analog dimming signal, and the driving transistor Tdr may still apply a driving current corresponding to the analog dimming signal to a plurality of light sources.

A driving circuit as shown in FIG. 10 is merely an example of the driving device 300, without being limited thereto. For example, the driving device 300 may include a 3T1C topology circuit obtained by adding a transistor to compensate for body effect of the driving transistor Tdr.

The driving device 300 may be provided, for example, in a single chip in which the circuit shown in FIG. 10 is integrated. In other words, the circuit shown in FIG. 10 may be integrated in a single semiconductor chip.

As such, each of the driving devices 300 may apply a driving current to light sources included in one dimming block. In this case, each of the driving devices 300 may receive a scan signal through one scan line, and receive an analog dimming signal through one data line.

Figure 11:
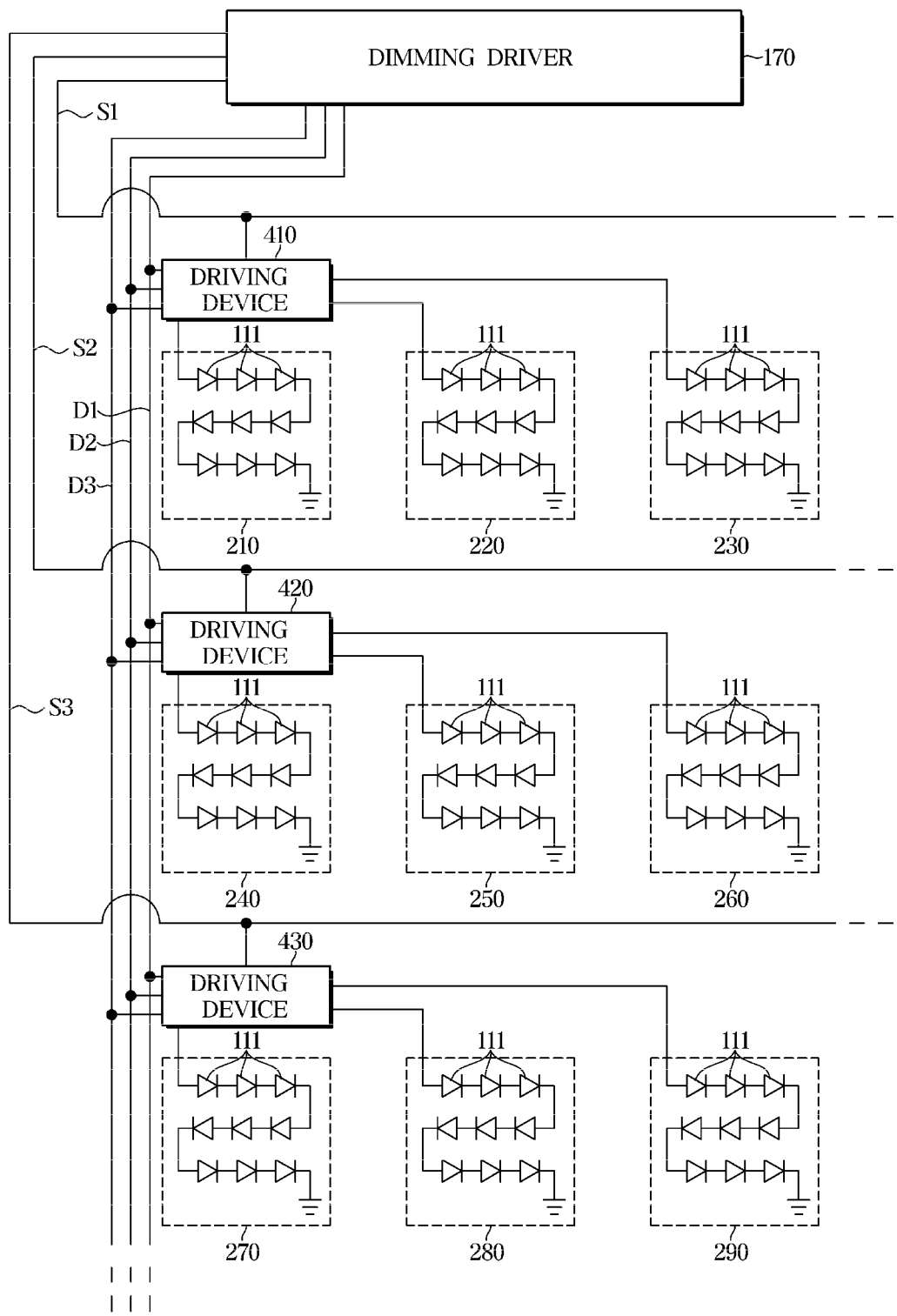
FIG. 11 illustrates a dimming driver and a light source device included in a display apparatus, according to an embodiment.
Figure 12:
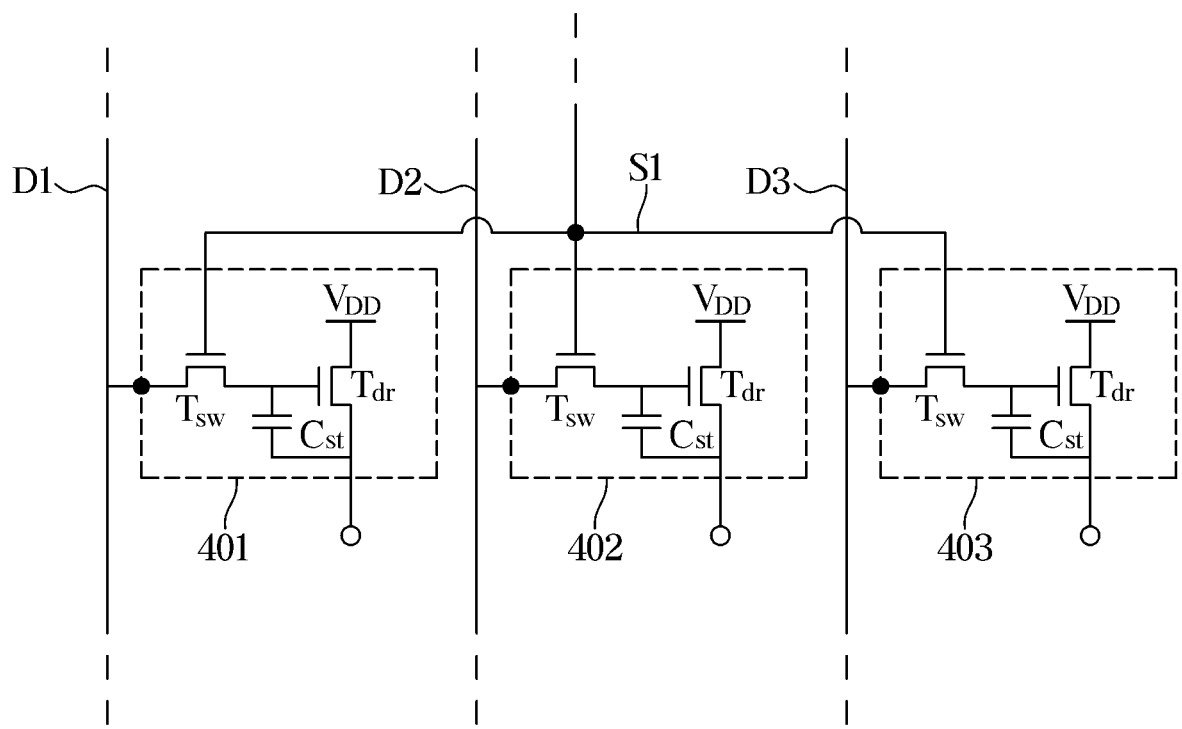
FIG. 12 illustrates driving devices included in a display apparatus, according to an embodiment.

FIG. 11 shows a dimming driver and a light source device included in a display apparatus, according to an embodiment. FIG. 12 illustrates driving devices included in a display apparatus, according to an embodiment.

Referring to FIGS. 11 and 12, the display apparatus 10 includes the dimming driver 170, a plurality of driving devices 400 (410, 420 and 430), and the plurality of light sources 111.

The plurality of driving devices 400 may receive an analog dimming signal from the dimming driver 170, and may apply a driving current to the plurality of light sources 111 according to the received analog dimming signal.

The plurality of light sources 111 may each include an LED, and may be divided into the plurality of dimming blocks 210, 220, 230, 240, 250, 260, 270, 280 and 290, collectively 200. For example, light sources belonging to the same dimming block may be connected in series and thus the same driving current may be applied to the light sources.

According to the embodiment shown in FIG. 11, each of the driving devices 400 may apply a driving current to light sources included in three dimming blocks located in the same row. For example, the first driving device 410 may apply a driving current to light sources belonging to the first dimming block 210, light sources belonging to the second dimming block 220 and light sources belonging to the third dimming block 230. The second driving device 420 may apply a driving current to light sources belonging to the fourth dimming block 240, light sources belonging to the fifth dimming block 250 and light sources belonging to the sixth dimming block 260. Further, the third driving device 430 may apply a driving current to light sources belonging to the seventh dimming block 270, light sources belonging to the eighth dimming block 280 and light sources belonging to the ninth dimming block 290.

The driving devices 400 may apply different driving currents to light sources belonging to different dimming blocks based on analog dimming signals. For example, the first driving device 410 may apply a first driving current to the plurality of light sources belonging to the first dimming block 210 according to an analog dimming signal, apply a second driving current to the plurality of light sources belonging to the second dimming block 220 according to an analog dimming signal, and apply a third driving current to the plurality of light sources belonging to the third dimming block 230 according to an analog dimming signal.

The driving devices 400 may be input-activated by scan signals from the dimming driver 170. In an input-activated state, the driving devices 400 may receive and store an analog dimming signal from the dimming driver 170, and may apply a driving current corresponding to the received analog dimming signal to the plurality of light sources. Further, while being input-deactivated, the driving devices 400 may apply a driving current corresponding to the stored analog dimming signal to the plurality of light sources.

For example, when the dimming driver 170 outputs a scan signal through the first scan line S1, the first driving device 410 may be input-activated. The first driving device 410 may receive and store analog dimming signals through the first data line D1, the second data line D2 and the third data line D3. The first driving device 410 may apply driving currents to the plurality of light sources of the first dimming block 210, the plurality of light sources of the second dimming block 220, and the plurality of light sources of the third dimming block 230 according to the received analog dimming signals.

Subsequently, when the dimming driver 170 outputs a scan signal through the second scan line S2, the second driving device 420 may be input-activated. The second driving device 420 may receive analog dimming signals through the first data line D1, the second data line D2 and the third data line D3. The second driving device 420 may apply driving currents to the plurality of light sources of the fourth dimming block 240, the plurality of light sources of the fifth dimming block 250 and the plurality of light sources of the sixth dimming block 260 according to the received analog dimming signals. In this case, the first driving device 410 is not input-activated, but may apply driving currents to the plurality of light sources of the first dimming block 210, the plurality of light sources of the second dimming block 220, and light sources of the third dimming block 230 according to the stored analog dimming signals.

As such, the first driving device 410 may receive analog dimming signals through the plurality of data lines D1, D2 and D3, and receive a scan signal through the scan line S1. The first driving device 410 may apply driving currents to the plurality of dimming blocks 210, 220 and 230 according to a plurality of analog dimming signals based on the receiving of the scan signal.

To implement the active matrix scheme based operation, the plurality of driving devices 400 may include, for example, driving circuits 401, 402 and 403, as shown in FIG. 12. The driving circuits 401, 402 and 403 may correspond to the respective dimming blocks.

Each of the plurality of driving devices 400 may include the first driving circuit 401 for driving the dimming block 210, 240 or 270 in the first column, the second driving circuit 402 for driving the dimming block 220, 250 or 280 in the second column, and the third driving circuit 403 for driving the dimming block 230, 260 or 290 in the third column.

The driving circuits may each include a driving transistor Tdr, a switching transistor Tsw and a storage capacitor Cst. A configuration of each of the driving circuits 401, 402 and 403 may be equivalent to the driving circuit 301 as described above in connection with FIG. 10.

In this case, the first driving circuit 401, the second driving circuit 402 and the third driving circuit 403 may share one scan line. Further, the first driving circuit 401, the second driving circuit 402, and the third driving circuit 403 may receive analog dimming signals from different data lines, respectively.

A circuit as shown in FIG. 12 is merely an example of the driving device 400, without being limited thereto.

The driving devices 400 may each apply driving currents to a plurality of dimming blocks arranged in the same row (or belonging to the same group). In this case, each of the driving devices 400 may receive a scan signal through one scan line, and simultaneously receive analog dimming signals through a plurality of data lines.

Figure 13:
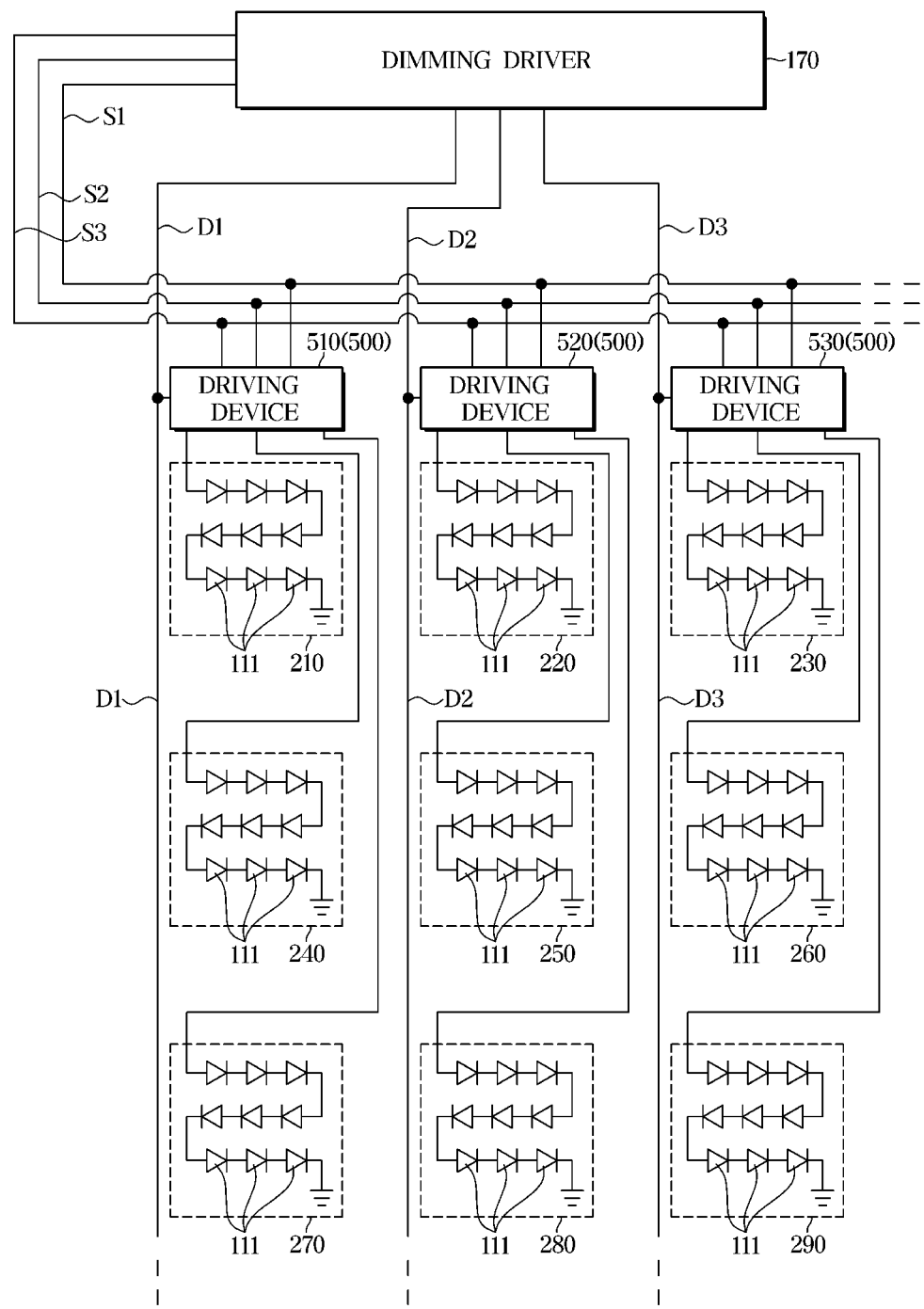
FIG. 13 illustrates a dimming driver and a light source device included in a display apparatus, according to an embodiment.
Figure 14:
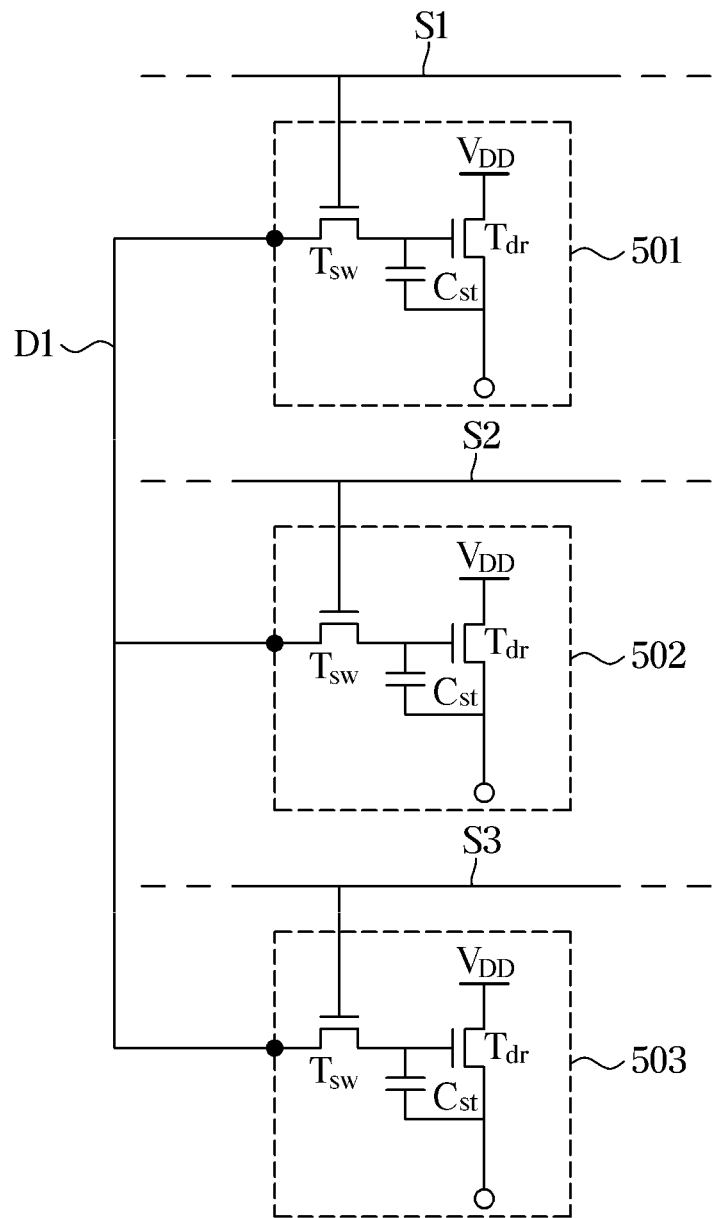
FIG. 14 illustrates driving devices included in a display apparatus, according to an embodiment.

FIG. 13 illustrates an example of a dimming driver and a light source device included in a display apparatus, according to an embodiment. FIG. 14 illustrates an example of driving devices included in a display apparatus, according to an embodiment.

Referring to FIGS. 13 and 14, the display apparatus 10 includes the dimming driver 170, a plurality of driving devices 500 (510, 520 and 530), and the plurality of light sources 111.

The plurality of light sources 111 may each include an LED, and may be divided into the plurality of dimming blocks 210, 220, 230, 240, 250, 260, 270, 280 and 290, collectively 200. For example, light sources belonging to the same dimming block may be connected in series and thus the same driving current may be applied to the light sources.

The plurality of driving devices 500 may receive analog dimming signals from the dimming driver 170, and may apply a driving current to the plurality of light sources 111 according to the received analog dimming signal.

According to the embodiment shown in FIG. 13, the driving devices 500 may each apply a driving current to light sources included in three dimming blocks located in the same column. For example, the first driving device 510 may apply driving currents to light sources belonging to the first dimming block 210, light sources belonging to the fourth dimming block 240 and light sources belonging to the seventh dimming block 270. The second driving device 520 may apply driving currents to light sources belonging to the second dimming block 220, light sources belonging to the fifth dimming block 250 and light sources belonging to the eighth dimming block 280. Further, the third driving device 530 may apply driving currents to light sources belonging to the third dimming block 230, light sources belonging to the sixth dimming block 260 and light sources belonging to the ninth dimming block 290.

The driving devices 500 may apply different driving currents to light sources belonging to different dimming blocks based on the analog dimming signal.

Each of the driving devices 500 may include driving circuits 501, 502 and 503, as shown in FIG. 14. The driving circuits 501, 502 and 503 may correspond to the respective dimming blocks, may be input-activated by scan signals from the dimming driver 170, and receive an analog dimming signal from the dimming driver 170 in the input-activated state.

For example, when the dimming driver 170 outputs a scan signal through the first scan line S1, input to the first driving circuit 501 of each of the first driving device 510, the second driving device 520 and the third driving device 530 may be activated. The first driving device 510 may receive an analog dimming signal through the first data line D1, the second driving device 520 may receive an analog dimming signal through the second data line D2, and the third driving device 530 may receive an analog dimming signal through the third data line D3.

Subsequently, when the dimming driver 170 outputs a scan signal through the second scan line S2, input to the second driving circuit 502 of each of the first driving device 510, the second driving device 520 and the third driving device 530 may be activated. The first driving device 510 may receive an analog dimming signal through the first data line D1, the second driving device 520 may receive an analog dimming signal through the second data line D2, and the third driving device 530 may receive an analog dimming signal through the third data line D3.

As such, each of the driving devices 500 may receive scan signals through the plurality of scan lines S1, S2 and S3 and receive an analog dimming signal through a data line D1, D2 or D3. Each of the driving devices 500 may sequentially apply driving currents to the plurality of dimming blocks based on sequential reception of the scan signals.

To implement this active matrix scheme based operation, the plurality of driving devices 500 may include, for example, driving circuits as shown in FIG. 14.

Each of the plurality of driving devices 500 may include the first driving circuit 501 for driving the dimming block 210, 220 or 230 in the first row, the second driving circuit 502 for driving the dimming block 240, 250 or 260 in the second row, and the third driving circuit 503 for driving the dimming block 270, 280 or 290 in the third row, The first driving circuit 501, the second driving circuit 502 and the third driving circuit 503 may each include a driving transistor Tdr, a switching transistor Tsw, and a storage capacitor Cst. A configuration of each of the first driving circuit 501, the second driving circuit 502 and the third driving circuit 503 may be equivalent to the driving circuit (driving device) as described above in connection with FIG. 10.

In this case, the first driving circuit 501, the second driving circuit 502 and the third driving circuit 503 may share one data line. Further, each of the first driving circuit 501, the second driving circuit 502, and the third driving circuit 503 may be input-activated by a scan signal through a different scan line.

The circuit as shown in FIG. 14 is merely an example of the driving device 500, without being limited thereto.

As described above, the driving devices 500 may apply driving currents to a plurality of dimming blocks arranged in the same row. In this case, the driving devices 500 may receive scan signals through a plurality of scan lines, and receive a plurality of analog dimming signals through one data line.

Further, each of the driving devices 500 may apply driving currents to light sources included in a plurality of dimming blocks 200.

The plurality of dimming blocks 200 may be arranged in the form of a matrix, and the plurality of dimming blocks 200 may be driven in the active matrix scheme.

For example, each of the driving device may apply a driving current to each of the dimming blocks (more specifically, light sources included in the dimming block) in the active matrix scheme.

In another example, each of the driving devices may apply driving currents to a plurality of dimming blocks belonging to the same group (or the same row). In other words, the driving device may include driving circuits for applying driving currents to a plurality of dimming blocks belonging to the same group.

In this case, the driving devices may receive a scan signal through one scan line, and receive a plurality of analog dimming signals through a plurality of data lines. Further, each of the driving devices may include one scan pin connected to one scan line and a plurality of data pins connected to a plurality of data lines.

In another example, each of the driving devices may apply driving currents to a number of dimming blocks belonging to different groups (or different rows). In other words, the driving device may include driving circuits for applying driving currents to a plurality of dimming blocks belonging to different groups.

In this case, each of the driving devices may sequentially receive a plurality of scan signals through a plurality of scan lines, and sequentially receive a plurality of analog dimming signals through one data line. Further, each of the driving devices may include a plurality of scan pins connected to a plurality of scan lines and one data pin connected to one data line.

Figure 15:
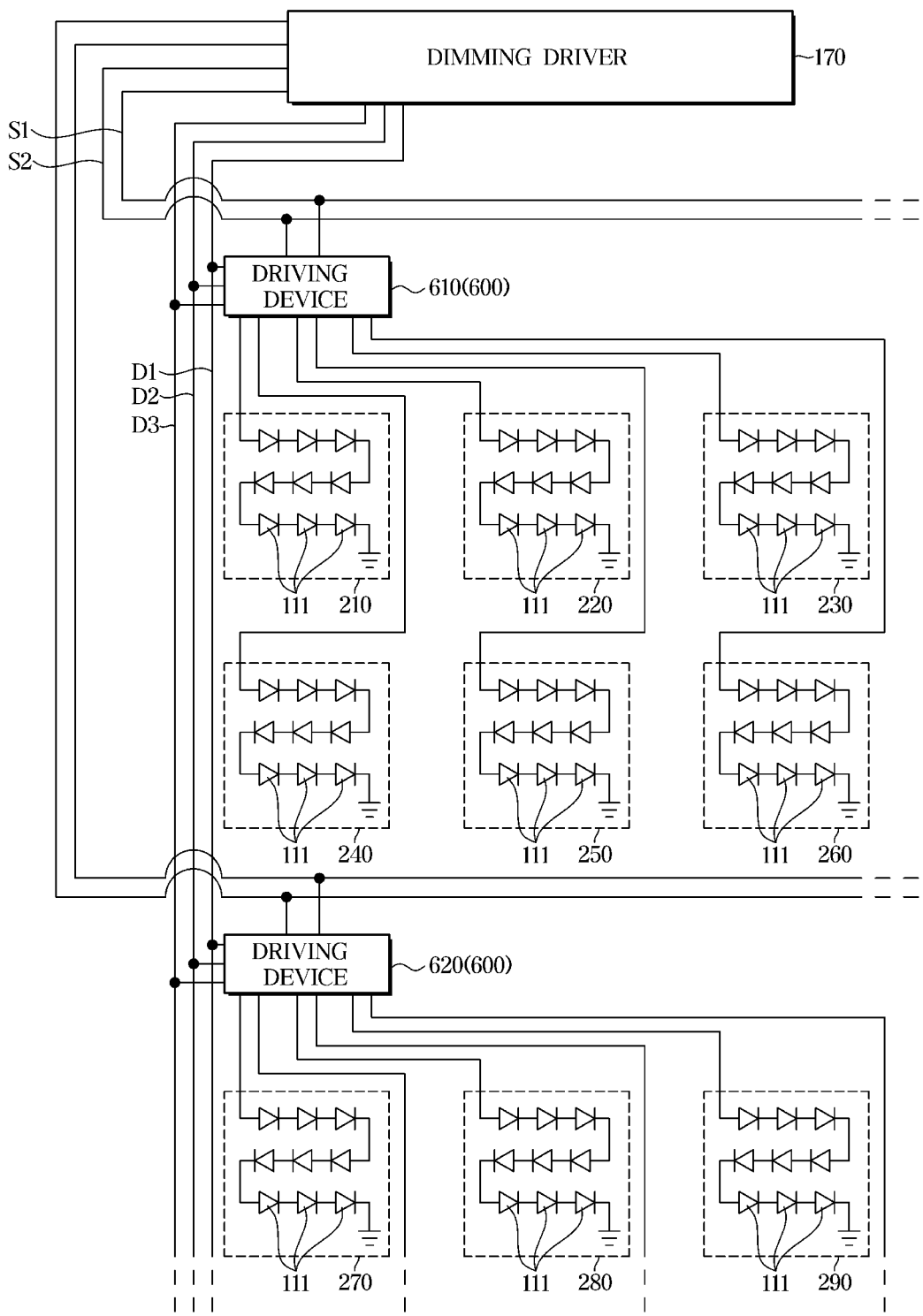
FIG. 15 illustrates a dimming driver and a light source device included in a display apparatus, according to an embodiment.

FIG. 15 illustrates a dimming driver and a light source device included in a display apparatus, according to an embodiment.

Referring to FIGS. 15, the display apparatus 10 includes the dimming driver 170, a plurality of driving devices 600 (610 and 620), and a plurality of light sources 111.

The plurality of driving devices 600 may receive an analog dimming signal from the dimming driver 170, and may apply driving currents to the plurality of light sources 111 according to the received analog dimming signal.

The plurality of light sources 111 may each include an LED, and may be divided into the plurality of dimming blocks 210, 220, 230, 240, 250, 260, 270, 280 and 290, collectively 200. For example, light sources belonging to the same dimming block may be connected in series and thus the same driving current may be applied to the light sources.

According to the embodiment shown in FIG. 15, the driving devices 600 may each apply driving currents to light sources included in six dimming blocks located in two rows and three columns (2×3). For example, the first driving device 610 may apply driving currents to light sources belonging to the first dimming block 210, light sources belonging to the second dimming block 220, light sources belonging to the third dimming block 230, light sources belonging to the fourth dimming block 240, light sources belonging to the fifth dimming block 250, light sources belonging to the sixth dimming block and light sources belonging to the seventh dimming block 260.

Each of the driving devices 600 may include six driving circuits corresponding to the six dimming blocks. For example, the first driving device 610 may include first to sixth driving circuits corresponding to the first to sixth dimming blocks 210 to 260.

The driving circuits may drive six dimming blocks, respectively. For example, when the dimming driver 170 outputs a scan signal through the first scan line S1, the first driving circuit, the second driving circuit and the third driving circuit included in the first driving device 610 may be input-activated. The input-activated first to third driving circuits may receive analog dimming signals through the first data line D1, the second data line D2 and the third data line D3, and apply driving currents to the first to third dimming blocks 210, 220 and 230.

When the dimming driver 170 outputs a scan signal through the second scan line S2, the fourth driving circuit, the fifth driving circuit and the sixth driving circuit included in the first driving device 610 may be input-activated. The input-activated fourth to sixth driving circuits may receive analog dimming signals through the first data line D1, the second data line D2 and the third data line D3, and apply driving currents to the fourth to sixth dimming blocks 240, 250 and 260.

As such, each of the driving devices 600 may receive scan signals through the plurality of scan lines S1 and S2 and receive analog dimming signals through a plurality of data lines D1, D2 and D3.

The number of scan lines S1 and S2 connected to the driving device 600 may correspond to the number of rows to which dimming blocks 200 driven by the driving device 600 belong. Further, the number of pins of the driving device 600 for receiving scan signals may correspond to the number of rows to which dimming blocks 200 driven by the driving device 600 belong.

The number of data lines D1, D2 and D3 connected to the driving device 600 may correspond to the number of columns to which dimming blocks 200 driven by the driving device 600 belong. Further, the number of pins of the driving device 600 for receiving analog dimming signals may correspond to the number of columns to which dimming blocks 200 driven by the driving device 600 belong.

Figure 16:
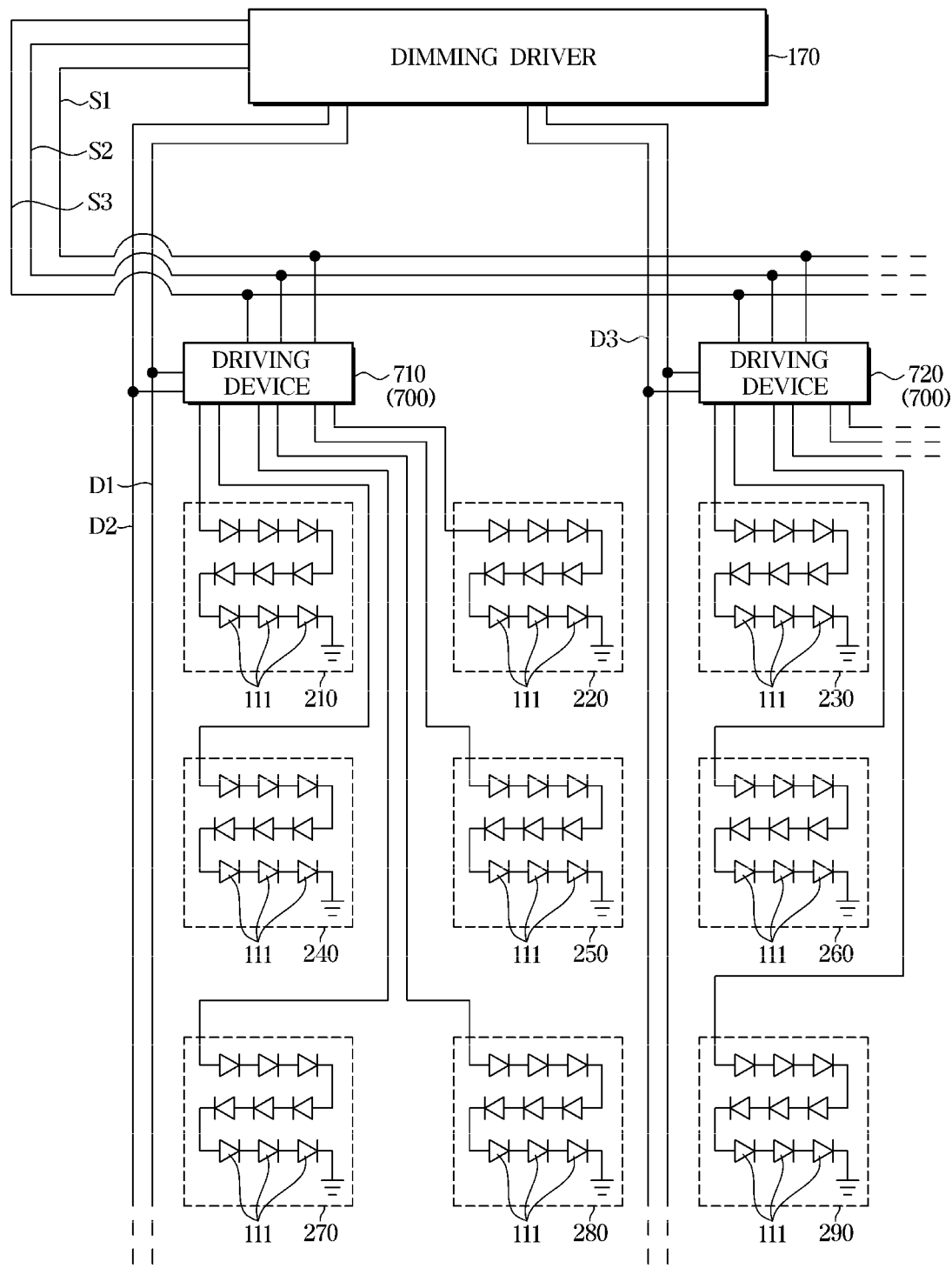
FIG. 16 illustrates a dimming driver and a light source device included in a display apparatus, according to an embodiment.

Referring to FIGS. 16, the display apparatus 10 includes the dimming driver 170, a plurality of driving devices 700 (710 and 720), and the plurality of light sources 111.

The plurality of driving devices 700 may receive analog dimming signals from the dimming driver 170, and may apply driving currents to the plurality of light sources 111 according to the received analog dimming signals.

The plurality of light sources 111 may each include an LED, and may be divided into the plurality of dimming blocks 210, 220, 230, 240, 250, 260, 270, 280 and 290, collectively 200. For example, light sources belonging to the same dimming block may be connected in series and thus the same driving current may be applied to the light sources.

According to the embodiment shown in FIG. 16, the driving devices 700 may each apply driving currents to light sources included in six dimming blocks located in three rows and two columns (3×2). For example, the first driving device 710 may apply driving currents to light sources belonging to the first dimming block 210, light sources belonging to the second dimming block 220, light sources belonging to the fourth dimming block 240, light sources belonging to the fifth dimming block 250, light sources belonging to the seventh dimming block 270, and light sources belonging to the eighth dimming block 280.

Each of the driving devices 700 may include six driving circuits corresponding to the six dimming blocks. For example, the first driving device 710 may include a first driving circuit, a second driving circuit, a fourth driving circuit, a fifth driving circuit, a seventh driving circuit and an eighth driving circuit corresponding to the first dimming block 210, the second dimming block 220, the fourth dimming block 240, the fifth dimming block 250, the seventh dimming block 270, and the eighth dimming block 280.

The driving circuits may drive six dimming blocks, respectively. For example, when the dimming driver 170 outputs a scan signal through the first scan line S1, the first driving circuit and the second driving circuit included in the first driving device 710 may be input-activated. The input-activated first and second driving circuits may receive analog dimming signals through the first data line D1 and the second data line D2, and apply driving currents to the first and second dimming blocks 210 and 220.

When the dimming driver 170 outputs a scan signal through the second scan line S2, the fourth driving circuit and the fifth driving circuit included in the first driving device 710 may be input-activated. The input-activated fourth and fifth driving circuits may receive analog dimming signals through the first data line D1 and the second data line D2, and apply driving currents to the fourth and fifth dimming blocks 240 and 250.

Further, when the dimming driver 170 outputs a scan signal through the third scan line S3, the seventh driving circuit and the eighth driving circuit included in the first driving device 710 may be input-activated. The input-activated seventh and eighth driving circuits may receive analog dimming signals through the first data line D1 and the second data line D2, and apply driving currents to the seventh and eighth dimming blocks 270 and 280.

As such, each of the driving devices 700 may receive scan signals through the plurality of scan lines S1, S2 and S3 and receive analog dimming signals through a plurality of data lines D1 and D2.

The number of scan lines S1, S2 and S3 connected to the driving device 700 may correspond to the number of rows to which dimming blocks 200 driven by the driving device 700 belong. Further, the number of pins of the driving device 700 for receiving scan signals may correspond to the number of rows to which dimming blocks 200 driven by the driving device 700 belong.

The number of data lines D1, D2 and D3 connected to the driving device 700 may correspond to the number of columns to which dimming blocks 200 driven by the driving device 700 belong. Further, the number of pins of the driving device 700 for receiving analog dimming signals may correspond to the number of columns to which dimming blocks 200 driven by the driving device 700 belong.

As shown in FIGS. 15 and 16, even though the driving devices drive the same number of dimming blocks, the number of scan signals and the number of analog dimming signals to be received by the driving devices may be different depending on the layout of the dimming blocks. Hence, the driving device 600 as shown in FIG. 15 and the driving device 700 as shown in FIG. 16 are different.

As such, the driving device may apply driving currents to light sources included in a plurality of dimming blocks. In this case, dimming blocks to which driving currents are applied by the same driving device may form an "operation area" or "driving area" on the substrate. In other words, the operation area (or driving area) may represent an area in which the plurality of dimming blocks driven by one driving device are occupied by light source device 100 or the display apparatus 10.

In this case, when the number of driving devices is reduced, mura caused by the driving devices may be reduced. To apply the driving current to the light sources 111, the driving devices may be arranged on the same surface with the light sources 111 on the substrate 112. In this case, the driving devices protrude from the substrate 112, causing unexpected mura.

To reduce the number of driving devices, an area operated by each driving device, i.e., an operation area, needs to increase. In other words, the number of dimming blocks driven by each driving device needs to increase.

For example, in the light source device 100 including 100 dimming blocks, when two dimming blocks are driven by each driving device, 50 driving devices are required. On the other hand, in the light source device 100 including 100 dimming blocks, when four dimming blocks are driven by each driving device, 25 driving devices are required.

As such, when the number of dimming blocks driven by each driving device increases, a total number of driving devices may be reduced although some of the driving devices operate partially. In other words, some of the driving circuits included in the driving device may be deactivated.

For example, in the light source device 100 including 100 dimming blocks, when six dimming blocks are driven by each driving device, there are 17 or more driving devices required and some of the driving devices may be partially deactivated.

Figure 17:
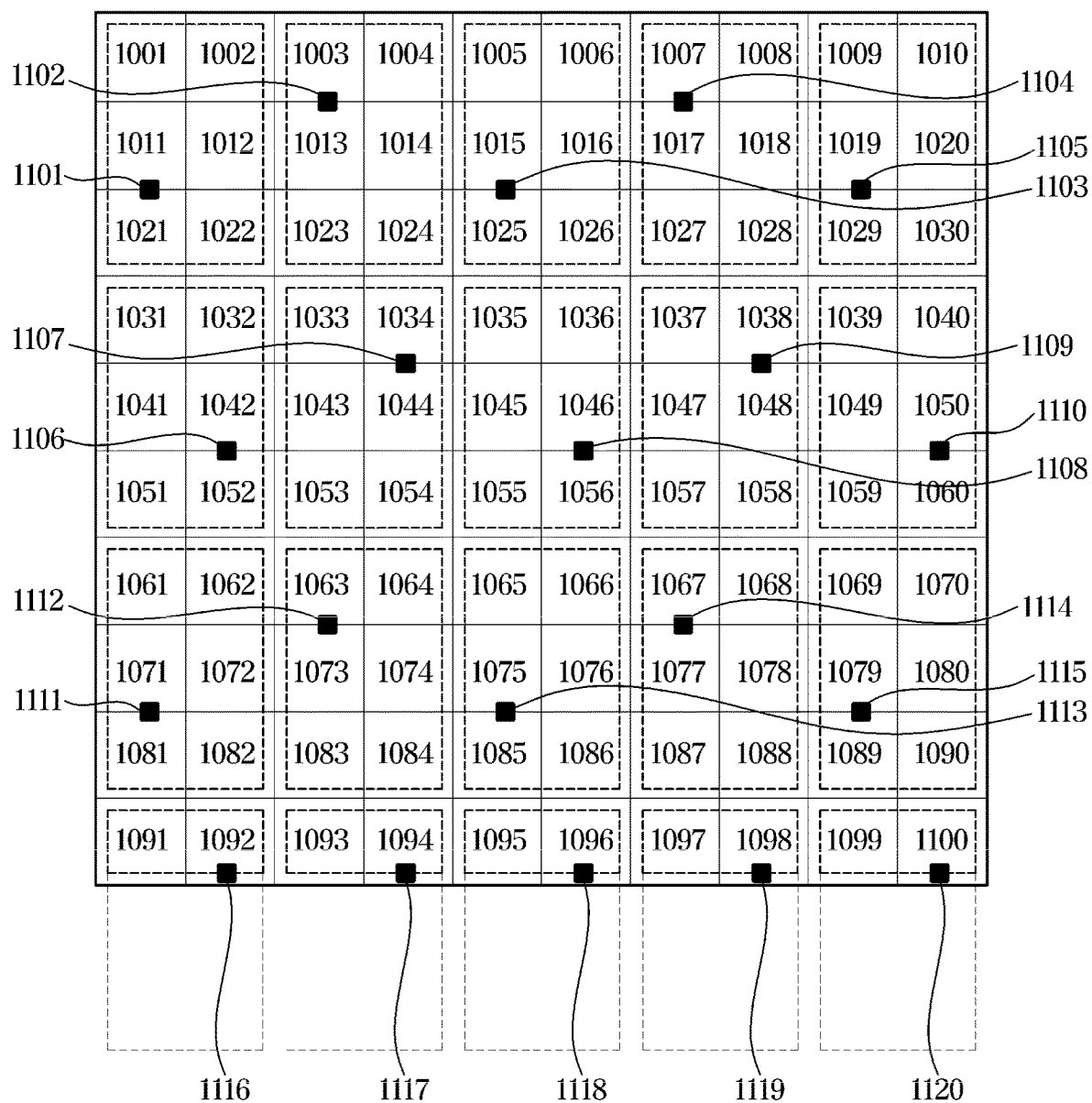
FIG. 17 illustrates an example in which one type of driving devices are arranged in a display apparatus, according to an embodiment.
Figure 18:
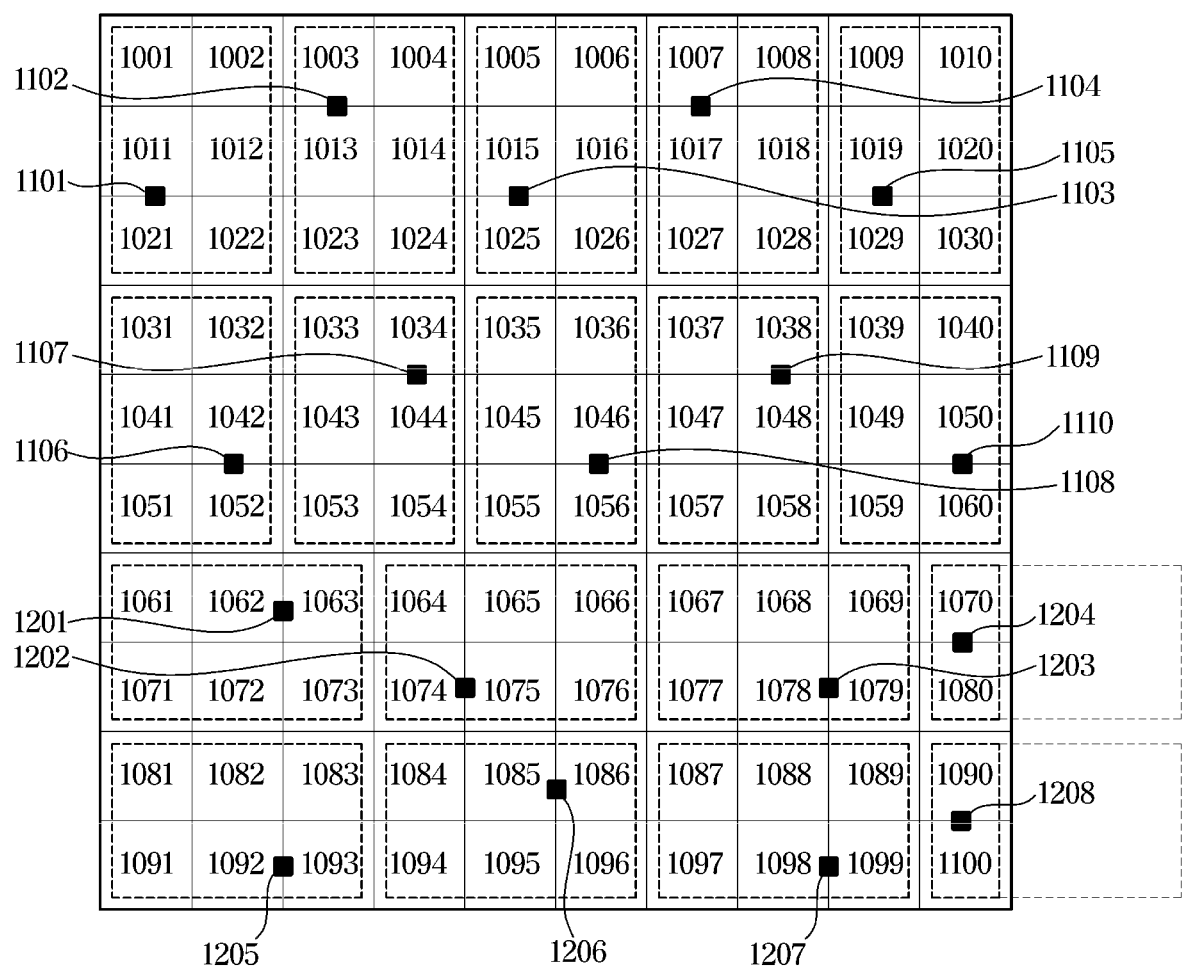
FIG. 18 illustrates an example in which two types of driving devices are arranged in a display apparatus, according to an embodiment.

FIG. 17 illustrates an example in which one type of driving devices are arranged in a display apparatus, according to an embodiment. FIG. 18 illustrates an example in which two types of driving devices are arranged in a display apparatus, according to an embodiment.

Referring to FIG. 17, the light source device 100 may include 100 dimming blocks 1001, 1002, 1003, . . . , 1100. Each of the 100 dimming blocks 1001, 1002, 1003, . . . , 1100 may include at least one light source, which may be connected in series.

First driving devices 1101, 1102, . . . , 1120 may apply driving currents to light sources included in the 100 dimming blocks 1001, 1002, 1003, . . . , 1100.

Each of the first driving devices 1101, 1102, . . . , 1120 may apply driving currents to light sources included in six dimming blocks. For example, each of the first driving devices 1101, 1102, . . . , 1120 may include six driving circuits to apply driving currents to six dimming blocks arranged in neighboring two columns and three rows. Further, each of the first driving devices 1101, 1102, . . . , 1120 may include two scan pins for receiving scan signals to drive six dimming blocks, three data pins for receiving analog dimming signals, and six output pins for outputting driving currents.

The first driving device 1101 that may drive 3×2 dimming blocks may apply driving currents to the dimming blocks 1001, 1002, 1011, 1012, 1021 and 1022. The first driving device 1102 may apply driving currents to the dimming blocks 1003, 1004, 1013, 1014, 1023 and 1024. In this way, 15 of the first driving devices 1101, 1102, 1103, . . . , 1115 may apply driving currents to 90 dimming blocks 1001, 1002, 1003, . . . , 1090. As such, the 15 first driving devices 1101, 1102, 1103, . . . , 1115 may form 15 operation areas each including 6 dimming blocks.

In this case, the first driving device having two scan pins and three data pins may drive 3×2 dimming blocks. Hence, to apply driving currents to the dimming blocks 1091, 1092, . . . , 1100 arranged in 10 columns, 5 of the first driving devices, each of which may drive dimming blocks in 2 columns, are arranged.

As shown in FIG. 17, the 5 first driving devices 1116, 1117, 1118, 1119 and 1120 may apply driving currents to 10 dimming blocks 1091, 1092, . . . , 1100. In other words, the first driving devices 1116, 1117, 1118, 1119 and 1120 may each apply driving currents to two dimming blocks. Further, the first driving devices 1116, 1117, 1118, 1119 and 1120 may form 5 operation areas each including 2 dimming blocks.

Hence, two driving circuits of 6 driving circuits included in each of the first driving devices 1116, 1117, 1118, 1119 and 1120 are used to apply driving currents to the dimming blocks while four driving circuits may be deactivated.

As shown in FIG. 17, in the case that one type of driving devices, each of which is able to drive 3×2 dimming blocks, are used to drive 10×10 dimming blocks, a total of 20 driving devices may be arranged and at least 5 of the 20 driving devices may be partially deactivated.

Referring to FIG. 18, the first driving devices 1101, 1102, . . . , 1110 and second driving devices 1201, 1202, . . . , 1208 may apply driving currents to light sources included in the 100 dimming blocks 1001, 1002, 1003, . . . , 1100.

The first driving devices 1101, 1102, . . . , 1110 may be equivalent to the first driving devices as shown in FIG. 17.

Each of the second driving devices 1201, 1202, . . . , 1208 may apply driving currents to light sources included in six dimming blocks in two rows and three columns. For example, each of the second driving devices 1201, 1202, . . . , 1208 may include 6 driving circuits to drive 6 dimming blocks and have 3 scan pins, 2 data pins, and 6 output pins.

The first driving devices 1101, 1102, . . . , 1110, each of which may drive 3×2 dimming blocks, may apply driving currents to 60 dimming blocks 1001, 1002, 1003, . . . , 1060. For example, the first driving devices 1101, 1102, 1103, . . . , 1110 may each apply driving currents to 6 dimming blocks. The first driving devices 1101, 1102, 1103, . . . , 1110 may form 10 operation areas each including 6 dimming blocks.

The second driving devices 1201, 1202, . . . , 1208, each of which may drive 2×3 dimming blocks, may apply driving currents to 40 dimming blocks 1061, 1062, . . . , 1100. For example, the second driving devices 1201, 1202, . . . , 1208 may each apply driving currents to 6 or 4 dimming blocks. The second driving devices 1201, 1202, . . . , 1208 may form 8 operation areas each including 6 or 4 dimming blocks.

For example, the 40 dimming blocks 1061, 1062, . . . , 1100 are arranged in 4 rows and 10 columns and thus 4 of the second driving devices, each of which may drive 2×3 dimming blocks, may be arranged horizontally while 2 of the second driving devices are arranged vertically. Accordingly, there may be 8 of the second driving devices 1201, 1202, . . . , 1208 arranged to drive the 40 dimming blocks 1061, 1062, . . . , 1100.

To drive 10×10 dimming blocks, 18 of two type driving devices may be arranged, whereas 20 of one type driving devices may be arranged. As compared to a case that only the first driving devices, each of which may drive 3×2 dimming blocks, are arranged, when both the first driving devices that may each drive 3×2 dimming blocks and the second driving devices that may each drive 2×3 dimming blocks are arranged, the number of driving devices may be reduced altogether.

The driving devices may correspond to impurities from an optical perspective. In other words, light may reflect or scatter to an unwanted direction from or from around the driving device. Hence, the fewer the number of driving devices, the lower the probability of occurrence of optical mura.

Accordingly, the optical mura may be further suppressed or reduced in an optical apparatus including two different types of driving devices.

Further, the reduction in the number of driving devices may lead to a reduction in manufacturing costs of the optical apparatus 100 and the display apparatus 10.

Moreover, as shown in FIG. 18, positions of the driving devices in neighboring operation areas may be relatively different, which may thus cause a reduction in mura due to regular arrangement of driving devices.

Using two different types of driving devices to reduce optical mura caused by the driving devices is not limited to the embodiment shown in FIG. 18.

For example, two different driving devices that may drive different numbers of dimming blocks may be used.

Figure 19:
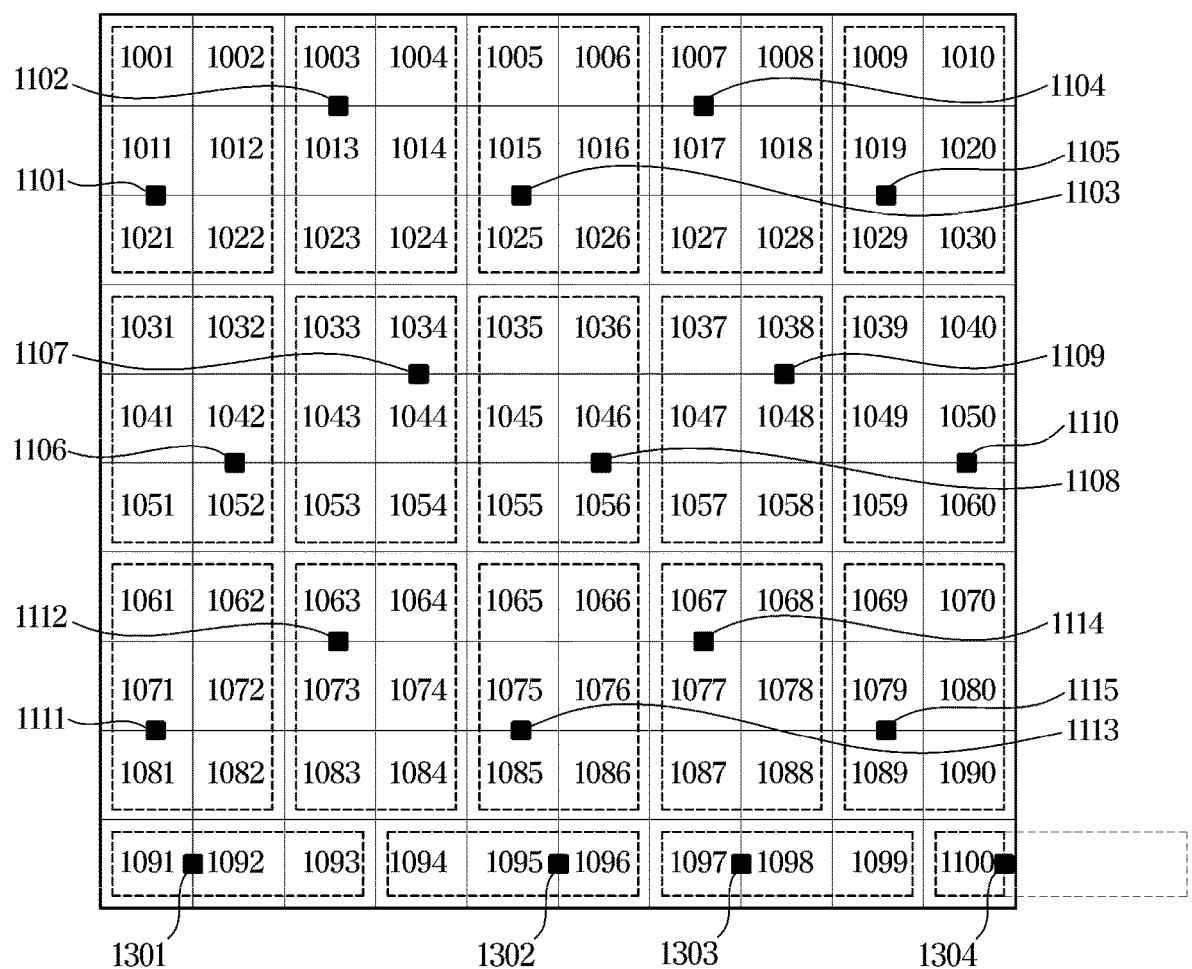
FIG. 19 illustrates an example in which two types of driving devices are arranged in a display apparatus, according to an embodiment.

FIG. 19 illustrates an example in which two types of driving devices are arranged in a display apparatus, according to an embodiment.

Referring to FIG. 19, the light source device 100 may include 100 dimming blocks 1001, 1002, 1003, . . . , 1100, each of which may include at least one light source connected in series.

The first driving devices 1101, 1102, . . . , 1115 and third driving devices 1301, 1302, 1304, and 1304 may apply driving currents to light sources included in the 100 dimming blocks 1001, 1002, 1003, . . . , 1100.

The first driving devices 1101, 1102, . . . , 1115 may be equivalent to the first driving devices as shown in FIG. 18.

Each of the third driving devices 1301, 1302, 1303 and 1304 may apply driving currents to light sources included in three dimming blocks in one row and three columns. For example, each of the third driving devices 1301, 1302 1303 and 1304 may include 3 driving circuits to drive 3 dimming blocks and have 3 scan pins, 1 data pin, and 3 output pins.

The first driving devices 1101, 1102, . . . , 1115, each of which may drive 3×2 dimming blocks, may apply driving currents to 90 dimming blocks 1001, 1002, 1003, . . . , 1090. For example, the first driving devices 1101, 1102, 1103, . . . , 1115 may each apply driving currents to 6 dimming blocks. The first driving devices 1101, 1102, 1103, . . . , 1115 may form 15 operation areas each including 6 dimming blocks.

The third driving devices 1301, 1302, 1303 and 1304, each of which may drive 1×3 dimming blocks, may apply driving currents to 10 dimming blocks 1091, 1092, . . . , 1100. For example, the third driving devices 1301, 1302, . . . , 1304 may each apply driving currents to 3 dimming blocks or 1 dimming block. The third driving devices 1301, 1302, 1303 and 1304 may form 4 operation areas each including 3 dimming blocks or 1 dimming block. For example, the 10 dimming blocks 1091, 1092, . . . , 1100 are arranged in one row and 10 columns and thus the third driving devices 1301, 1302, 1303 and 1304, each of which may drive 1×3 dimming blocks, may be arranged horizontally.

As shown in FIG. 19, nineteen driving devices may be arranged to drive 10×10 dimming blocks. As compared to a case that only the first driving devices that may each drive 3×2 dimming blocks are arranged, when both the first driving devices that may each drive 3×2 dimming blocks and the third driving devices that may each drive 1×3 dimming blocks are arranged, the number of driving devices may be reduced.

Accordingly, the optical mura may be further suppressed or reduced in an optical apparatus including two different types of driving devices.

Moreover, as shown in FIG. 19, positions of the driving devices in neighboring operation areas may be relatively different, which may thus cause a reduction in mura due to regular arrangement of driving devices.

Using two different types of driving devices to reduce optical mura caused by the driving devices is not limited to the example in which the driving device drives 6 dimming blocks.

Figure 20:
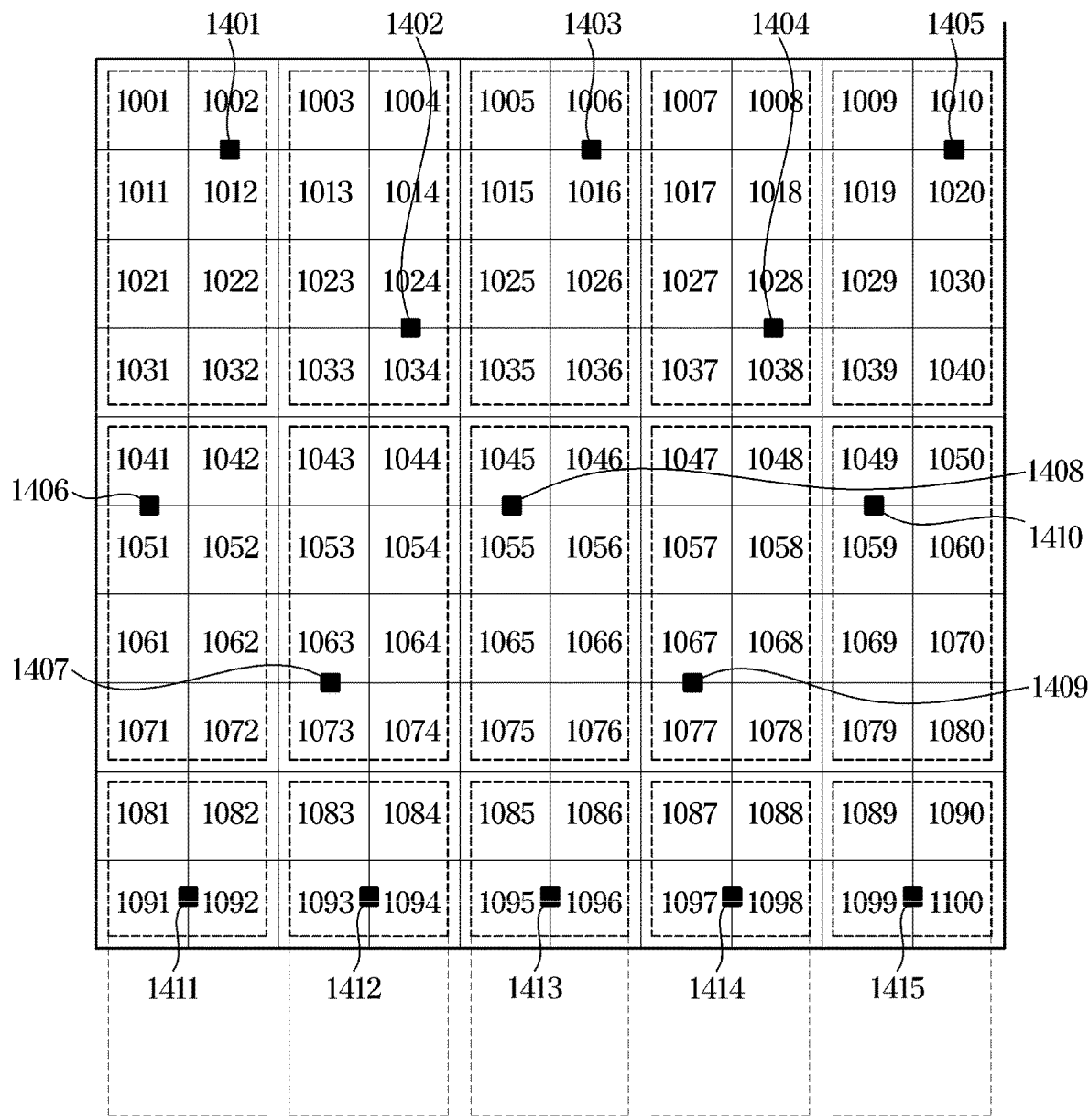
FIG. 20 illustrates an example in which one type of driving devices are arranged in a display apparatus, according to an embodiment.
Figure 21:
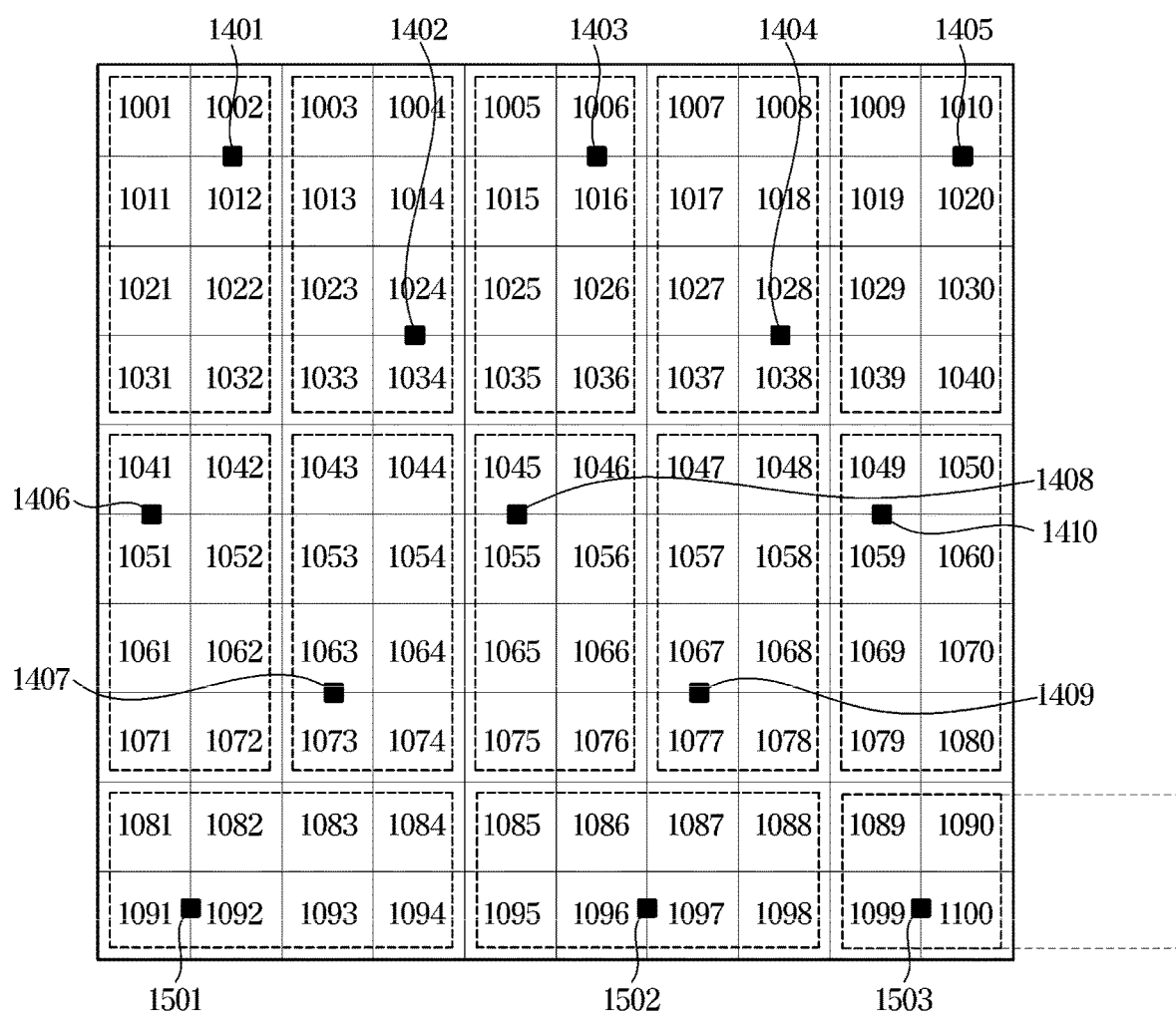
FIG. 21 illustrates an example in which two types of driving devices are arranged in a display apparatus, according to an embodiment.

FIG. 20 illustrates an example in which one type of driving devices are arranged in a display apparatus, according to an embodiment. FIG. 21 illustrates an example in which two types of driving devices are arranged in a display apparatus, according to an embodiment.

Referring to FIG. 20, the light source device 100 may include 100 dimming blocks 1001, 1002, 1003, . . . , 1100. Each of the 100 dimming blocks 1001, 1002, 1003, . . . , 1100 may include at least one light source, which may be connected in series for example.

Fourth driving devices 1401, 1402, . . . , 1415 may apply driving currents to light sources included in the 100 dimming blocks 1001, 1002, 1003, . . . , 1100.

Each of the fourth driving devices 1401, 1402, . . . , 1415 may apply driving currents to light sources included in eight dimming blocks in four rows and two columns. For example, each of the fourth driving devices 1401, 1402, . . . , 1415 may include 8 driving circuits to drive 8 dimming blocks and have 2 scan pins, 4 data pins, and 8 output pins.

Ten of the fourth driving devices 1401, 1102, . . . , 1410, each of which may drive 4×2 dimming blocks, may apply driving currents to 80 dimming blocks 1001, 1002, 1003, . . . , 1080. As such, the 10 fourth driving devices 1401, 1402, . . . , 1410 may form 10 operation areas each including 8 dimming blocks.

Five of the fourth driving devices 1411, 1411, 1412, 1413 and 1415, each of which may drive 4×2 dimming blocks, may apply driving currents to 20 dimming blocks 1081, 1082, . . . , 1100. In other words, the fourth driving devices 1411, 1412, 1413, 1414 and 1415 may each apply driving currents to four dimming blocks.

As such, in the case that one type of driving devices, each of which is able to drive 4×2 dimming blocks, are used to drive 10×10 dimming blocks, a total of 15 driving devices may be arranged and at least 5 of the 15 driving devices may be partially deactivated.

Further, referring to FIG. 21, the fourth driving devices 1401, 1402, . . . , 1410 and fifth driving devices 1501, 1502 and 1503 may apply driving currents to light sources included in the 100 dimming blocks 1001, 1002, 1003, . . . , 1100.

Each of the fourth driving devices 1401, 1402, . . . , 1410 may be equivalent to the fourth driving device as shown in FIG. 20.

Each of the fifth driving devices 1501, 1502 and 1503 may apply driving currents to light sources included in 8 dimming blocks in two rows and four columns. For example, each of the fifth driving devices 1501, 1502 and 1503 may include 8 driving circuits to drive 8 dimming blocks and have 4 scan pins, 2 data pins, and 8 output pins.

Ten of the fourth driving devices 1401, 1402, . . . , 1410, each of which may drive 4×2 dimming blocks, may apply driving currents to 80 dimming blocks 1001, 1002, 1003, . . . , 1080.

Three of the fifth driving devices 1501, 1502 and 1503, each of which may drive 2×4 dimming blocks, may apply driving currents to 20 dimming blocks 1081, 1082, . . . , 1100. For example, the 20 dimming blocks 1081, 1082, . . . , 1100 are arranged in 2 rows and 10 columns and thus three of the fifth driving devices, each of which may drive 2×4 dimming blocks, may be arranged horizontally, thereby driving 20 dimming blocks 1081, 1082, . . . , 1100.

To drive 10×10 dimming blocks, 13 of two type driving devices may be arranged, whereas 15 of one type of driving devices may be arranged. As compared to a case that only the fourth driving devices that may each drive 4×2 dimming blocks are arranged, when both the fourth driving devices that may each drive 4×2 dimming blocks and the fifth driving devices that may each drive 2×4 dimming blocks are arranged, the number of driving devices may be reduced.

Accordingly, the optical mura may be further suppressed or reduced in an optical apparatus including two different types of driving devices. Further, the reduction in the number of driving devices may lead to a reduction in manufacturing costs of the optical apparatus 100 and the display apparatus 10.

Figure 22:
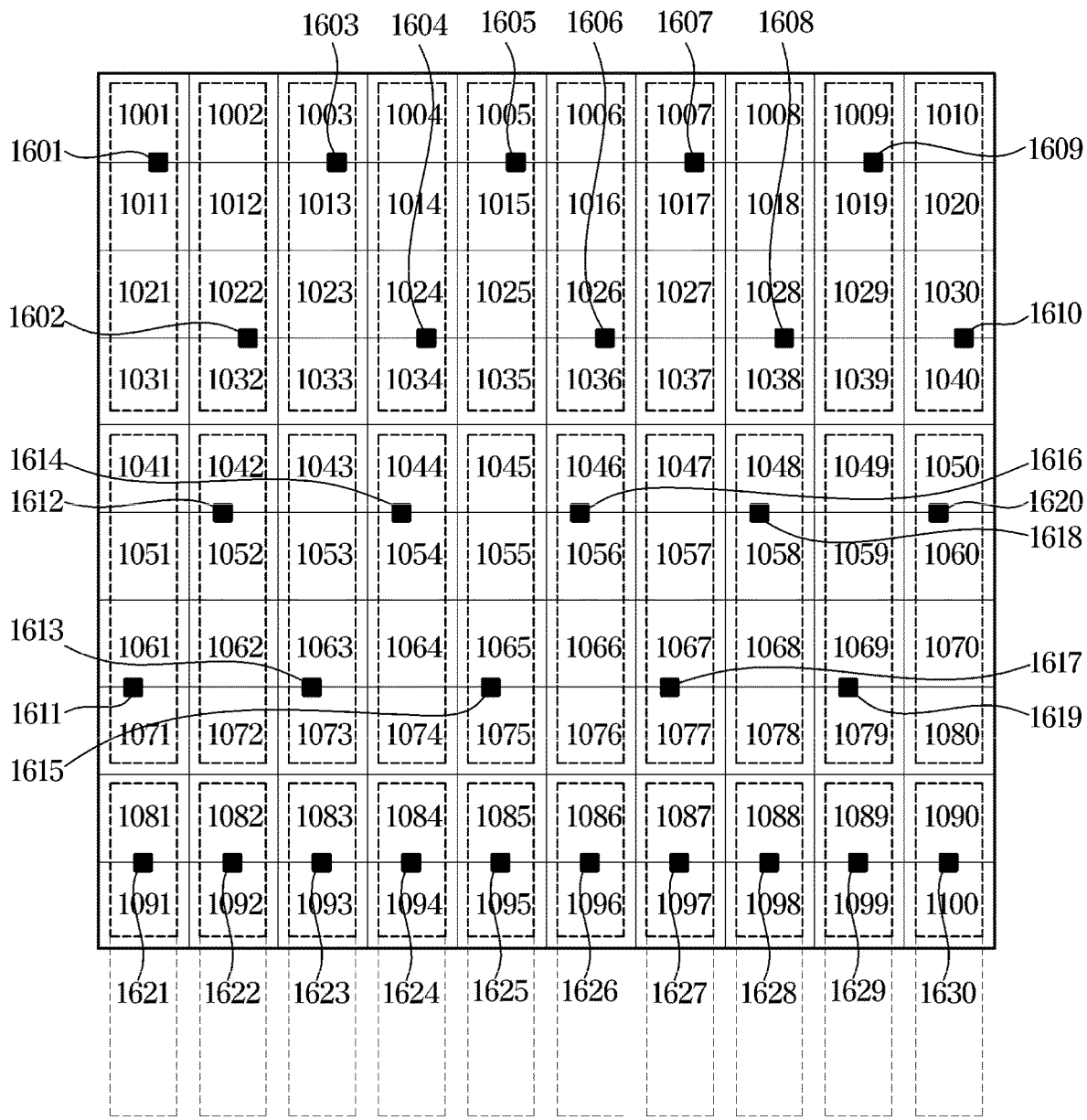
FIG. 22 illustrates an example in which one type of driving devices are arranged in a display apparatus, according to an embodiment.
Figure 23:
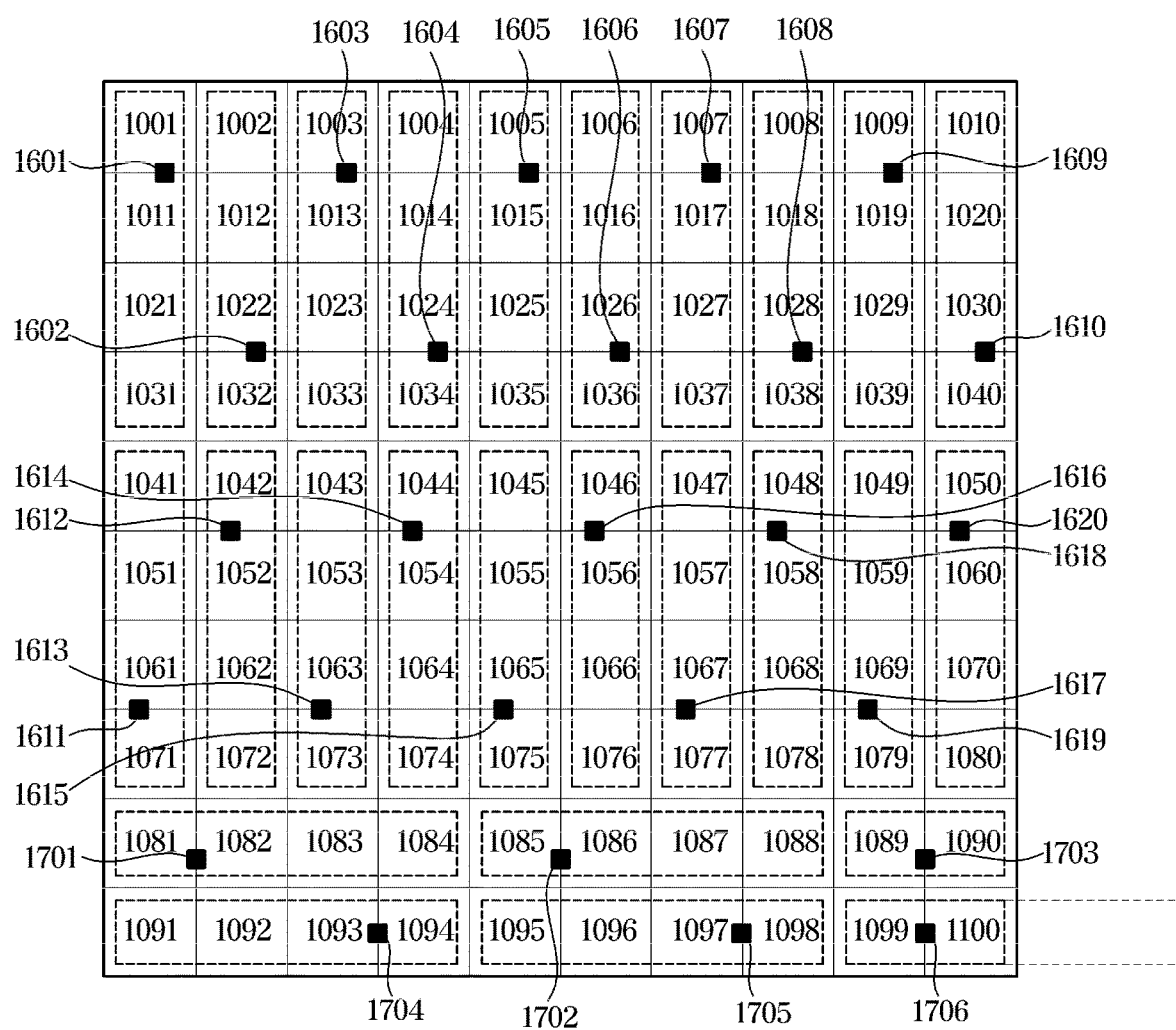
FIG. 23 illustrates an example in which two types of driving devices are arranged in a display apparatus, according to an embodiment.

FIG. 22 illustrates an example in which one type of driving devices are arranged in a display apparatus, according to an embodiment. FIG. 23 illustrates an example in which two types of driving devices are arranged in a display apparatus, according to an embodiment.

Referring to FIG. 22, the light source device 100 may include 100 dimming blocks 1001, 1002, 1003, . . . , 1100. Each of the 100 dimming blocks 1001, 1002, 1003, . . . , 1100 may include at least one light source, which may be connected in series for example.

Sixth driving devices 1601, 1602, . . . , 1630 may apply driving currents to light sources included in the 100 dimming blocks 1001, 1002, 1003, . . . , 1100.

Each of the sixth driving devices 1601, 1602, . . . , 1630 may apply driving currents to light sources included in four dimming blocks in four rows and one column. For example, each of the sixth driving devices 1601, 1602, . . . , 1630 may include 4 driving circuits to drive 4 dimming blocks and have 1 scan pin, 4 data pins, and 4 output pins.

Twenty of the sixth driving devices 1601, 1102, . . . , 1620, each of which may drive 4×1 dimming blocks, may apply driving currents to 80 dimming blocks 1001, 1002, 1003, . . . , 1080. As such, the 20 sixth driving devices 1601, 1602, . . . , 1620 may form 20 operation areas each including 4 dimming blocks.

Ten of the sixth driving devices 1621, 1622, . . . , 1630, each of which may drive 4×1 dimming blocks, may apply driving currents to 20 dimming blocks 1081, 1082, . . . , 1100. In other words, the sixth driving devices 1621, 1622, . . . , 1630 may each apply driving currents to two dimming blocks.

As such, in the case that one type of driving devices, each of which is able to drive 4×1 dimming blocks, are used to drive 10×10 dimming blocks, a total of 30 driving devices may be arranged and at least 10 of the 30 driving devices may be partially deactivated.

Further, referring to FIG. 23, the sixth driving devices 1601, 1602, . . . , 1620 and seventh driving devices 1701, 1702, . . . , 1706 may apply driving currents to light sources included in the 100 dimming blocks 1001, 1002, 1003, . . . , 1100.

Each of the sixth driving devices 1601, 1602, ..., 1620 may be equivalent to the sixth driving device as shown in FIG. 22.

Each of the seventh driving devices 1701, 1702, ..., 1706 may apply driving current to light sources included in four dimming blocks in one row and four columns. For example, each of the seventh driving devices 1701, 1702, ..., 1706 may include 4 driving circuits to drive 4 dimming blocks and have 4 scan pins, 1 data pin, and 4 output pins.

Twenty of the sixth driving devices 1601, 1602, ..., 1620, each of which may drive 4×1 dimming blocks, may apply driving currents to 80 dimming blocks 1001, 1002, 1003, ..., 1080.

Six of the seventh driving devices 1701, 1702, ..., 1706, each of which may drive 1×4 dimming blocks, may apply driving currents to 20 dimming blocks 1081, 1082, ..., 1100. For example, the 20 dimming blocks 1081, 1082, ..., 1100 are arranged in 2 rows and 10 columns and thus 3 of the seventh driving devices, each of which may drive 1×4 dimming blocks, may be arranged horizontally while 2 of the seventh driving devices are arranged vertically. Accordingly, there may be 6 of the seventh driving devices 1701, 1702, ..., 1706 arranged to drive the 20 dimming blocks 1081, 1082, ..., 1100.

Figure 24:
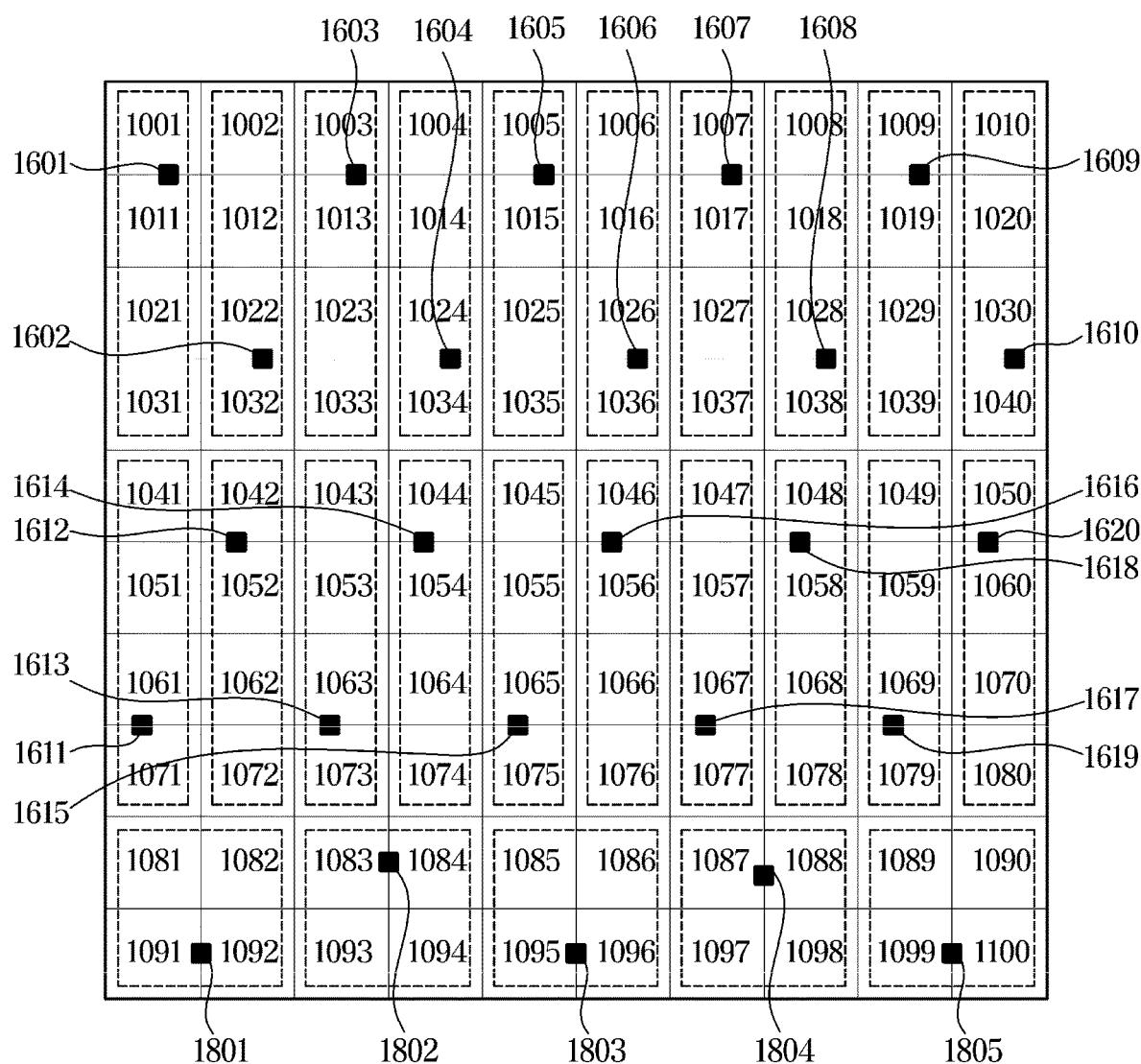
FIG. 24 illustrates an example in which two types of driving devices are arranged in a display apparatus, according to an embodiment.

Referring to FIG. 24, the sixth driving devices 1601, 1602, ..., 1620 and eighth driving devices 1801, 1802, ..., 1805 may apply driving currents to light sources included in the 100 dimming blocks 1001, 1002, 1003, ..., 1100.

Each of the sixth driving devices 1601, 1602, ..., 1620 may be equivalent to the sixth driving device as shown in FIG. 22.

Each of the eighth driving devices 1801, 1802, ..., 1805 may apply driving currents to light sources included in four dimming blocks in two rows and two columns. For example, each of the eighth driving devices 1801, 1802, ..., 1805 may include 4 driving circuits to drive 4 dimming blocks and have 2 scan pins, 2 data pins, and 4 output pins.

Twenty of the sixth driving devices 1601, 1102, ..., 1620, each of which may drive 4×1 dimming blocks, may apply driving currents to 80 dimming blocks 1001, 1002, 1003, ..., 1080.

Five of the eighth driving devices 1801, 1802, ..., 1805, each of which may drive 2×2 dimming blocks, may apply driving currents to 20 dimming blocks 1081, 1082, ..., 1100. For example, the 20 dimming blocks 1081, 1082, ..., 1100 are arranged in 2 rows and 10 columns and thus 5 of the eighth driving devices, each of which may drive 2×2 dimming blocks, may be arranged horizontally, thereby driving 20 dimming blocks 1081, 1082, ..., 1100.

As such, to drive 10×10 dimming blocks, 26 or 25 of two type driving devices may be arranged, whereas 30 of one type driving devices may be arranged. As compared to a case that only the sixth driving devices that may each drive 4×1 dimming blocks are arranged, when both the sixth driving devices that may each drive 4×1 dimming blocks and the seventh driving devices that may each drive 1×4 dimming blocks are arranged, the number of driving devices may be reduced. Further, when both the sixth driving devices that may each drive 4×1 dimming blocks and the eighth driving devices that may each drive 2×2 dimming blocks are arranged together, the number of the driving devices may be reduced as well.

Accordingly, the optical mura may be further suppressed or reduced in an optical apparatus including two different types of driving devices. Further, the reduction in the number of driving devices may lead to a reduction in manufacturing costs of the optical apparatus 100 and the display apparatus 10.

According to one or more embodiments of the disclosure, different types of driving devices may be used to minimize the number of driving devices in a set standard without deactivating part of driving circuits included in the driving devices.

Although various embodiments of the disclosure have been described, it will be understood that the present disclosure may be practiced in other forms than the embodiments as described above without changing the technical idea or essential features of the present disclosure. The above embodiments are only by way of example, and should not be interpreted in a limited sense.

What is claimed is:

1. A display apparatus comprising:
a liquid crystal panel;
a plurality of light sources configured to emit light;
a substrate comprising a plurality of dimming blocks arranged in rows and columns, each dimming block of the plurality of dimming blocks comprising at least one light source of the plurality of light sources;
a first driving device configured to control a driving current applied to light sources in first dimming blocks of the plurality of dimming blocks, wherein the first dimming blocks are divided into a plurality of first groups, and each of the plurality of first groups includes a same number of first dimming blocks among the first dimming blocks of the plurality of dimming blocks; and
a second driving device configured to control a driving current applied to light sources in second dimming blocks of the plurality of dimming blocks, wherein the second dimming blocks are divided into a plurality of second groups, wherein the first dimming blocks, the second dimming blocks, the first driving device, and the second driving device are arranged on a first side of the substrate, wherein a number of the second dimming blocks included in each of the plurality of second groups is less than or equal to the number of the first dimming blocks included in each of the plurality of first groups, wherein a number of the second dimming blocks in each of at least one second group among the plurality of second groups is less than a number of the second dimming blocks in each of remaining second groups among the plurality of second groups, wherein a layout of the first dimming blocks included in each of the plurality of first groups is the same, wherein a layout of the second dimming blocks included in each of the at least one second group among the plurality of second groups is different from a layout of the second dimming blocks included in each of the remaining second groups among the plurality of second groups, wherein the layout of the first dimming blocks included in each of the plurality of first groups is different from a layout of the second dimming blocks included in each of the plurality of second groups, wherein the first driving device comprises a plurality of first driving circuits for applying driving currents to the first dimming blocks included in the plurality of first groups, wherein the second driving device comprises a plurality of second driving circuits for applying driving currents to the second dimming blocks included in the plurality of second groups, wherein a number of the second driving circuits for each of the plurality of second groups is less than or equal to a number of the first driving circuits for each of the plurality of first groups, wherein a number of the second driving circuits for each of the at least one second group among the plurality of second groups is a same as a number of the second driving circuits for each of the remaining second groups among the plurality of second groups, and wherein when the plurality of second driving circuits drive the second dimming blocks included in the plurality of second groups, at least one second driving circuit among the second driving circuits for each of the at least one second group among the plurality of second groups is deactivated while remaining second driving circuits among the second driving circuits for each of the at least one second group among the plurality of second groups apply the driving currents to the second dimming blocks included in each of the at least one second group among the plurality of second groups.

2. The display apparatus of claim 1, wherein a number of rows in which the first dimming blocks included in each of the plurality of first groups are arranged is different from a number of rows in which the second dimming blocks included in each of the plurality of second groups are arranged.

3. The display apparatus of claim 1, wherein a number of columns in which the first dimming blocks included in each of the plurality of first groups are arranged is different from a number of columns in which the second dimming blocks included in each of the plurality of second groups are arranged.

4. The display apparatus of claim 1, further comprising a dimming driver configured to control the first driving device and the second driving device,
wherein each of the first driving device and the second driving device is configured to receive a scan signal and a dimming signal from the dimming driver, and
wherein a number of pins of the first driving device for receiving the scan signal is different from a number of pins of the second driving device for receiving the scan signal.

5. The display apparatus of claim 1, further comprising a dimming driver configured to control the first driving device and the second driving device,
wherein each of the first driving device and the second driving device is configured to receive a scan signal and a dimming signal from the dimming driver, and
wherein a number of pins of the first driving device for receiving the dimming signal is different from a number of pins of the second driving device for receiving the dimming signal.

6. The display apparatus of claim 1, wherein a number of rows in which the first dimming blocks included in each of the plurality of first groups are arranged is different from a number of columns in which the second dimming blocks included in each of the plurality of second groups are arranged, and
wherein a number of columns in which the first dimming blocks included in each of the plurality of first groups are arranged is a same as a number of rows in which the second dimming blocks included in each of the plurality of second groups are arranged.

7. The display apparatus of claim 1, wherein the first dimming blocks included in each of the plurality of first groups are arranged in a row, and
wherein the second dimming blocks included in each of the plurality of second groups are arranged in a column.

8. The display apparatus of claim 7, wherein the first driving device is configured to control a driving current applied to light sources in four first dimming blocks of the first dimming blocks included in each of the plurality of first groups and arranged in a row, and
wherein the second driving device is configured to control a driving current applied to light sources in four second dimming blocks of the second dimming blocks included in each of the plurality of second groups arranged in a column.

9. The display apparatus of claim 1, wherein a number of the first dimming blocks of the plurality of dimming blocks is different from a number of the second dimming blocks of the plurality of dimming blocks.

10. The display apparatus of claim 1, wherein light sources in each of the plurality of dimming blocks are connected in series.

11. The display apparatus of claim 1, wherein the first driving device is disposed between the first dimming blocks of the plurality of dimming blocks, and
wherein the second driving device is disposed between the second dimming blocks of the plurality of dimming blocks.

12. The display apparatus of claim 11, wherein a relative position of the first driving device in the first dimming blocks of the plurality of dimming blocks is different from a relative position of the second driving device in the second dimming blocks of the plurality of dimming blocks.

13. The display apparatus of claim 1, wherein each of the first driving device and the second driving device comprises:
a first transistor;
a capacitor connected to a control terminal of the first transistor; and
a second transistor connected to the control terminal of the first transistor.

14. The display apparatus of claim 1, wherein each of the plurality of light sources comprises:
a light-emitting diode (LED) provided on the substrate in a chip on board (COB) method; and
an optical dome having a cross-section shaped like a bow or a semicircle.

15. The display apparatus of claim 14, wherein an intensity of a first light beam emitted from the LED in a first direction perpendicular to the substrate is smaller than an intensity of a second light beam emitted from the LED in a second direction different from the first direction.

* * * * *